(12) United States Patent
Uesaka et al.

(10) Patent No.: US 8,203,673 B2
(45) Date of Patent: *Jun. 19, 2012

(54) ELLIPTICAL POLARIZER AND VERTICAL ALIGNMENT TYPE LIQUID CRYSTAL DISPLAY DEVICE COMPRISING THE SAME

(75) Inventors: Tetsuya Uesaka, Yokohama (JP); Satoru Ikeda, Yokohama (JP)

(73) Assignee: Nippon Oil Corporation, Tokyo (JP)

( * ) Notice: Subject to any disclaimer, the term of this patent is extended or adjusted under 35 U.S.C. 154(b) by 387 days.

This patent is subject to a terminal disclaimer.

(21) Appl. No.: 12/515,107

(22) PCT Filed: Oct. 30, 2007

(86) PCT No.: PCT/JP2007/071455
§ 371 (c)(1),
(2), (4) Date: May 15, 2009

(87) PCT Pub. No.: WO2008/059721
PCT Pub. Date: May 22, 2008

(65) Prior Publication Data
US 2010/0026936 A1   Feb. 4, 2010

(30) Foreign Application Priority Data

Nov. 17, 2006  (JP) .................................. 2006-311743
Nov. 17, 2006  (JP) .................................. 2006-311744

(51) Int. Cl.
*G02B 5/30* (2006.01)
*G02B 27/28* (2006.01)
*G02F 1/1335* (2006.01)

(52) U.S. Cl. ............ 349/96; 359/485.03; 359/489.15
(58) Field of Classification Search ............ 359/485.03
See application file for complete search history.

(56) References Cited

U.S. PATENT DOCUMENTS

| | | | |
|---|---|---|---|
| 5,193,020 | A | 3/1993 | Shiozaki et al. |
| 5,413,657 | A | 5/1995 | Yamanashi et al. |
| 5,519,523 | A | 5/1996 | Madokoro et al. |
| 5,699,136 | A | 12/1997 | Arakawa et al. |
| 6,208,396 | B1 | 3/2001 | Shimizu et al. |
| 6,320,634 | B1 | 11/2001 | Winker et al. |
| 6,970,214 | B2 | 11/2005 | Sato et al. |

(Continued)

FOREIGN PATENT DOCUMENTS

EP     0 350 383 A2     1/1990

(Continued)

OTHER PUBLICATIONS

U.S. Office Action issued Nov. 30, 2004 in U.S. Appl. No. 10/791,113.

(Continued)

*Primary Examiner* — Michelle R Connelly

(74) *Attorney, Agent, or Firm* — Panitch Schwarze Belisario & Nadel LLP

(57) ABSTRACT

An elliptical polarizer with excellent viewing angle characteristics is provided which comprises at least a first polarizer, a first optical anisotropic layer, a second optical anisotropic layer, and a third optical anisotropic layer, laminated in this order, wherein the first optical anisotropic layer satisfies [1] $50 \leq Re1 \leq 500$, the second optical anisotropic layer satisfies [2] $0 \leq Re2 \leq 20$ and [3] $-500 \leq Rth2 \leq -30$, and the third optical anisotropic layer satisfies [4] $100 \leq Re3 \leq 180$ wherein Re and Rth indicate the retardation values in the plane and thickness direction, respectively, of each of the optical anisotropic layers.

30 Claims, 14 Drawing Sheets

| 1. Linear Polarizer |
|---|
| 2. First optical   anisotropic layer |
| 3. Second optical   anisotropic layer |
| 4. Third optical   anisotropic layer |

| 1. Linear Polarizer |
|---|
| 2. First optical   anisotropic layer |
| 3. Second optical   anisotropic layer |
| 4. Third optical   anisotropic layer |
| 5. Fourth optical   anisotropic layer |
| 7. Substrates |
| 9. Counter electrode |
| 11. Liquid crystal layer (vertical alignment) |
| 10. Transparent electrode |
| 8. Substrates |
| 5. Fourth optical   anisotropic layer |
| 12. Fifth optical   anisotropic layer |
| 3. Second optical   anisotropic layer |
| 2. First optical   anisotropic layer |
| 13. Linear Polarizer |

6. Vertical alignment type liquid crystal cell

U.S. PATENT DOCUMENTS

| | | | |
|---|---|---|---|
| 7,732,024 B2* | 6/2010 | Mazaki et al. | 428/1.3 |
| 7,880,839 B2* | 2/2011 | Nakamura | 349/118 |
| 7,898,620 B2* | 3/2011 | Ikeda et al. | 349/117 |
| 2001/0048497 A1 | 12/2001 | Miyachi et al. | |
| 2005/0225706 A1 | 10/2005 | Miyachi et al. | |
| 2006/0203162 A1 | 9/2006 | Ito et al. | |
| 2007/0263152 A1* | 11/2007 | Mazaki et al. | 349/130 |
| 2009/0091691 A1 | 4/2009 | Sato et al. | |
| 2009/0251642 A1 | 10/2009 | Nakamura et al. | |
| 2010/0026936 A1 | 2/2010 | Uesaka et al. | |
| 2010/0085522 A1* | 4/2010 | Uesaka et al. | 349/119 |
| 2010/0171916 A1* | 7/2010 | Mazaki et al. | 349/127 |
| 2010/0182544 A1* | 7/2010 | Ikeda et al. | 349/75 |
| 2010/0309414 A1* | 12/2010 | Tomonaga et al. | 349/96 |
| 2011/0063547 A1* | 3/2011 | Takahashi et al. | 349/98 |
| 2011/0116004 A1* | 5/2011 | Takahashi et al. | 349/61 |

FOREIGN PATENT DOCUMENTS

| | | | |
|---|---|---|---|
| EP | 0 482 620 A2 | 4/1992 | |
| EP | 1644439 A1 | 4/2006 | |
| JP | 63-239421 A | 10/1988 | |
| JP | 02-015239 A | 1/1990 | |
| JP | 03-103823 A | 4/1991 | |
| JP | 04003001 A | 1/1992 | |
| JP | 04-057017 A | 2/1992 | |
| JP | 05-080323 A | 4/1993 | |
| JP | 05-157911 A | 6/1993 | |
| JP | 05-333313 A | 12/1993 | |
| JP | 06-214116 | 8/1994 | |
| JP | 07261023 A | 10/1995 | |
| JP | 07-306406 A | 11/1995 | |
| JP | 08278491 A | 10/1996 | |
| JP | 10-123506 A | 5/1998 | |
| JP | 2000347027 A | 12/2000 | |
| JP | 2002-040428 A | 2/2002 | |
| JP | 2002-055342 A | 2/2002 | |
| JP | 2002214439 A | 7/2002 | |
| JP | 2002258269 A | 9/2002 | |
| JP | 2003-207782 A | 7/2003 | |
| JP | 2005-004096 A | 1/2005 | |
| JP | 2005-062668 A | 3/2005 | |
| JP | 2005-062672 A | 3/2005 | |
| JP | 2005-189633 A | 7/2005 | |
| JP | 2005-202101 A | 7/2005 | |
| JP | 2006-085203 A | 3/2006 | |
| JP | 2006-098946 A | 4/2006 | |
| JP | 2008-129175 A | 6/2008 | |
| JP | 2008-129176 A | 6/2008 | |
| WO | 96/10773 A1 | 4/1996 | |
| WO | 0146720 A1 | 6/2001 | |

OTHER PUBLICATIONS

Int'l Search Report issued on Jun. 30, 2009 in Int'l Application No. PCT/JP2009/001797.

U.S. Appl. No. 12/674,799, filed Feb. 23, 2010.

U.S. Appl. No. 12/994,190, filed Nov. 23, 2010.

Notice of Allowance issued Nov. 18, 2011 in U.S. Appl. No. 12/994,190.

European Search Report issued Jan. 5, 2012 in Application No. 07831188.3-2217/2083290 PCT/JP2007071455.

* cited by examiner

Fig. 7

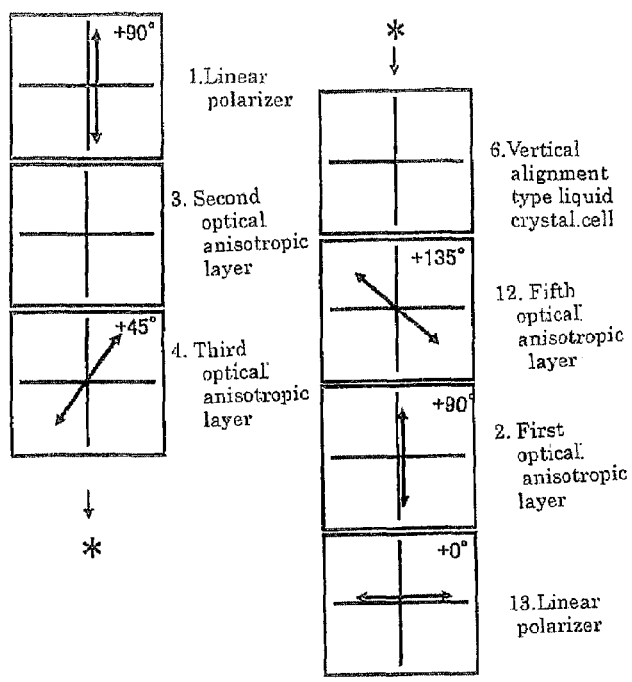

Fig. 8

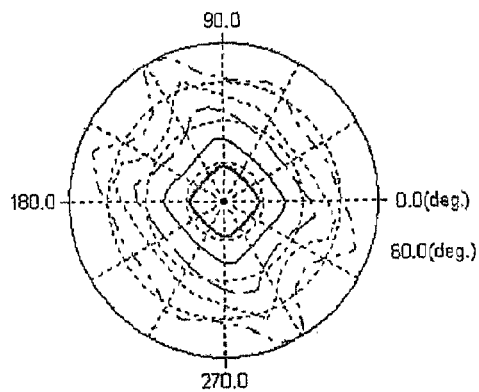

Fig. 9

| 1. Linear Polarizer |
| --- |
| 2. First optical anisotropic layer |
| 3. Second optical anisotropic layer |
| 4. Third optical anisotropic layer |
| 7. Substrates |
| 9. Counter electrode |
| 11. Liquid crystal layer (vertical alignment) |
| 10. Transparent electrode  ‖  15. Reflective electrode |
| 8. Substrates |
| 12. Fifth optical anisotropic layer |
| 13. Linear Polarizer |

14. transflective vertical alignment type liquid crystal cell

Fig. 18

| 1. Linear Polarizer |
| --- |
| 2. First optical anisotropic layer |
| 3. Second optical anisotropic layer |
| 4. Third optical anisotropic layer |
| 5. Fourth optical anisotropic layer |
| 7. Substrates |
| 9. Counter electrode |
| 11. Liquid crystal layer (vertical alignment) |
| 10. Transparent electrode |
| 8. Substrates |
| 12. Fifth optical anisotropic layer |
| 13. Linear Polarizer |

6. Vertical alignment type liquid crystal cell

Fig. 19

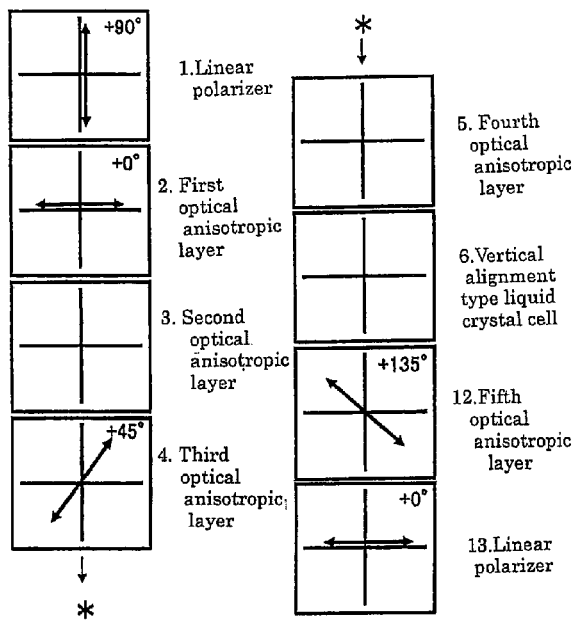

Fig. 20

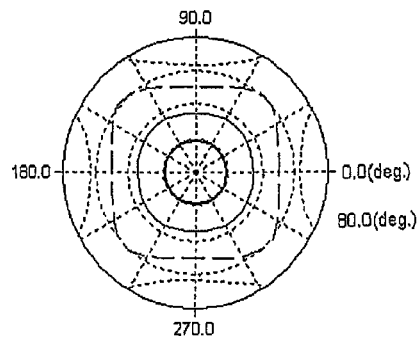

ELLIPTICAL POLARIZER AND VERTICAL ALIGNMENT TYPE LIQUID CRYSTAL DISPLAY DEVICE COMPRISING THE SAME

CROSS-REFERENCE TO RELATED APPLICATION

This application is a Section 371 of International Application No. PCT/JP2007/071455, filed Oct. 30, 2007, which was published in the Japanese language on May 22, 2008 under International Publication No. WO 2008/059721 A1, and the disclosure of which is incorporated herein by reference.

FIELD OF THE INVENTION

The present invention relates to elliptical polarizers with excellent viewing angle characteristics and liquid crystal display devices, in particular vertical alignment type liquid crystal display devices where liquid crystal molecules are aligned vertically with respect to a substrate when no electric voltage is applied.

BACKGROUND OF THE INVENTION

As one example of the display modes of a liquid crystal display device, there is a vertical alignment mode wherein the liquid crystal molecules in a liquid crystal cell are aligned vertically with respect to the substrates thereof under the initial conditions. When no electric voltage is applied, the liquid crystal molecules are aligned vertically with respect to a substrate. Therefore, a black image is obtained if linear polarizers are arranged in a orthogonal relation to one another on a liquid crystal cell.

The optical characteristics in the liquid crystal cell is isotropic in the plane direction, and thus ideal viewing angle compensation is easily achieved. In order to compensate a positive uniaxial anisotropy in the liquid crystal cell thickness direction, an optical element with a negative uniaxial isotropy in the thickness direction is inserted between one or both surface of the liquid crystal cell and the linear polarizers, resulting in extremely excellent black display viewing angle characteristics.

When an electric voltage is applied, the liquid crystal molecules changes in alignment from the direction vertical to the substrate surfaces toward the direction parallel thereto. Thereupon, it is difficult to align uniformly the liquid crystal molecules. The use of a conventional alignment treatment, i.e., rubbing treatment leads to a significant reduction in display quality.

In order to align uniformly the liquid crystal molecules when an electric voltage is applied, there is a proposal wherein the shape of electrodes on the substrate is modified to generate an oblique electric field in the liquid crystal layer. According to this proposal, although a uniform liquid crystal molecule alignment is achieved, nonuniformly aligned regions if viewed microscopically are formed and become dark regions when an electric voltage is applied. Therefore, the liquid crystal display device is decreased in transmissivity.

According to Patent Document 1 below, there is a proposal wherein circular polarizers are replaced for linear polarizers arranged on both sides of an liquid crystal element having a random-aligned liquid crystal layer. The use of circular polarizers each comprising a linear polarizer combined with a ¼ wavelength plate in place of the linear polarizers can eliminate dark regions formed when an electric voltage is applied and accomplish the production of a liquid crystal display device with a higher transmissivity. However, a vertical alignment type liquid crystal display device with circular polarizers has a problem that the viewing angle characteristics are narrower than a vertical alignment type liquid crystal display device with linear polarizers. According to Patent Document 2 below, it is proposed to use an optical anisotropic element with a negative uniaxial anisotropy or a biaxial optical anisotropic material in order to compensate the viewing angle of the vertical alignment type liquid crystal display device with circular polarizers. However, the optical anisotropic element with a negative uniaxial anisotropy can compensate the positive uniaxial optical anisotropy in the liquid crystal cell thickness direction but can not compensate the viewing angle characteristics of a ¼ wavelength plate, resulting in a failure to obtain sufficient viewing angle characteristics. Further, upon the production of the biaxial optical anisotropic material, NZ defined as $Nz=(nx-nz)/(nx-ny)$ is $-1.0<Nz<0.1$ wherein nx and ny indicate the main refractive indices in the plane of the resulting optical anisotropic plate, nz indicate the refractive index in the thickness direction, and nx>ny. Therefore, there is a limit in stretching in the thickness direction and thus the retardation in the thickness direction can not be controlled within a wide rage. Further, since in the foregoing production method, an elongate film is stretched in the thickness direction by utilizing the heat-contraction of a heat contractive film, the resulting retardation plate becomes thicker than the elongate film. The thickness of the retardation film produced by the method is from 50 to 100 μm and is insufficient for low profiling required in liquid crystal display devices or the like.

In order to compensate the viewing angle of a vertical alignment type liquid crystal display device with circular polarizers, Patent Documents 3 and 4 below proposes a structure wherein three types of elements such as an optical anisotropic element with a negative uniaxial optical anisotropy for compensating the liquid crystal cell, a compensation layer that is large in refractive index in the thickness direction for compensating the viewing angle of the ¼ wavelength plate and a polarizer compensating film are combined. However, when each of these 3 types of the films are arranged on both sides of the display device, 6 sheets of the films in total are used and further λ/4 plates are used on both sides, resulting in the use of 8 sheets of these films. Therefore, they can significantly improve the viewing angle but are not practical in view of production cost and thickness.

(1) Patent Document 1: Japanese Patent Application Laid-Open Publication No. 2002-40428
(2) Patent Document 2: Japanese Patent Application Laid-Open Publication No. 2003-207782
(3) Patent Document 3: Japanese Patent Application Laid-Open Publication No. 2002-55342
(4) Patent Document 4: Japanese Patent Application Laid-Open Publication No. 2006-85203

DISCLOSURE OF THE INVENTION

The present invention has an object to provide an elliptical polarizer which is inexpensive and excellent in viewing angle characteristics, for a vertical alignment type liquid crystal display device and such a display device.

As the results of the extensive researches and studies, the present invention was accomplished on the basis of the finding that the object was achieved with an elliptical polarizer described below and a vertical alignment type liquid crystal display device equipped with the same.

That is, the present invention provides the following (1) to (30):

(1) an elliptical polarizer comprising at least a first polarizer, a first optical anisotropic layer, a second optical anisotropic layer, and a third optical anisotropic layer, laminated in this order, wherein the first optical anisotropic layer satisfies requirement [1] below $$50 \leq Re1 \leq 500 \qquad [1]$$

wherein Re1 denotes the retardation value in the plane of the first optical anisotropic layer and is defined by $Re1=(Nx1-Ny1) \times d1$ [nm] wherein d1 indicates the thickness of the first optical anisotropic layer, Nx1 and Ny1 indicate the main refractive indices in the plane of the first optical anisotropic layer with respect to a light of a wavelength of 550 nm, Nz1 indicates the main refractive index in the thickness direction of the first optical anisotropic layer with respect to a light of a wavelength of 550 nm, and $Nx1>Nz1 \geq Ny1$;

the second optical anisotropic layer satisfies requirements [2] and [3] below $$0 \leq Re2 \leq 20 \qquad [2]$$

$$-500 \leq Rth2 \leq -30 \qquad [3]$$

wherein Re2 and Rth2 indicate the retardation values in the plane of the second optical anisotropic layer and in the thickness direction of the second optical anisotropic layer, respectively and are defined by $Re2=(Nx2-Ny2) \times d2$ [nm] and $Rth2=\{(Nx2+Ny2)/2-Nz2\} \times d2$ [nm], respectively wherein d2 indicates the thickness of the second optical anisotropic layer, Nx2 and Ny2 indicate the main refractive indices in the plane of the second optical anisotropic layer with respect to a light of a wavelength of 550 nm, Nz2 indicates the main refractive index in the thickness direction of the second optical anisotropic layer with respect to a light of a wavelength of 550 nm, and $Nz2>Nx2 \geq Ny2$; and the third optical anisotropic layer satisfies requirement [4] below $$100 \leq Re3 \leq 180 \qquad [4]$$

wherein Re3 indicates the retardation value in the plane of the third optical anisotropic layer and is defined by $Re3=(Nx3-Ny3) \times d3$ [nm] wherein d3 indicates the thickness of the third optical anisotropic layer, Nx3 and Ny3 indicate the main refractive indices in the plane of the third optical anisotropic layer with respect to a light of a wavelength of 550 nm, Nz3 indicates the main refractive index in the thickness direction of the third optical anisotropic layer with respect to a light of a wavelength of 550 nm, and $Nx3>Ny3>Nz3$;

(2) the elliptical polarizer according to (1), wherein the third optical anisotropic layer further satisfies requirements [5] and [6] below $$50 \leq Rth3 \leq 600 \qquad [5]$$

$$0.5 \leq Rth3/Re3 \leq 3.5 \qquad [6]$$

wherein Rth3 indicates the retardation value in the thickness direction of the third optical anisotropic layer and is defined by $Rth3=\{(Nx3+Ny3)/2-Nz3\} \times d3$ [nm];

(3) an elliptical polarizer comprising at least a first polarizer, a first optical anisotropic layer, a second optical anisotropic layer, a third optical anisotropic layer, and a fourth optical anisotropic layer, laminated in this order, wherein the first optical anisotropic layer satisfies requirement [1] below $$50 \leq Re1 \leq 500 \qquad [1]$$

wherein Re1 denotes the retardation value in the plane of the first optical anisotropic layer and is defined by $Re1=(Nx1-Ny1) \times d1$ [nm] wherein d1 indicates the thickness of the first optical anisotropic layer, Nx1 and Ny1 indicate the main refractive indices in the plane of the first optical anisotropic layer with respect to a light of a wavelength of 550 nm, Nz1 indicates the main refractive index in the thickness direction of the first optical anisotropic layer with respect to a light of a wavelength of 550 nm, and $Nx1>Nz1 \geq Ny1$;

the second optical anisotropic layer satisfies requirements [2] and [3] below $$0 \leq Re2 \leq 20 \qquad [2]$$

$$-500 \leq Rth2 \leq -30 \qquad [3]$$

wherein Re2 and Rth2 indicate the retardation values in the plane of the second optical anisotropic layer and in the thickness direction of the second optical anisotropic layer, respectively and are defined by $Re2=(Nx2-Ny2) \times d2$ [nm] and $Rth2=\{(Nx2+Ny2)/2-Nz2\} \times d2$ [nm], respectively wherein d2 indicates the thickness of the second optical anisotropic layer, Nx2 and Ny2 indicate the main refractive indices in the plane of the second optical anisotropic layer with respect to a light of a wavelength of 550 nm, Nz2 indicates the main refractive index in the thickness direction of the second optical anisotropic layer with respect to a light of a wavelength of 550 nm, and $Nz2>Nx2 \geq Ny2$;

the third optical anisotropic layer satisfies requirement [4] below $$100 \leq Re3 \leq 180 \qquad [4]$$

wherein Re3 indicates the retardation value in the plane of the third optical anisotropic layer and is defined by $Re3=(Nx3-Ny3) \times d3$ [nm] wherein d3 indicates the thickness of the third optical anisotropic layer, Nx3 and Ny3 indicate the main refractive indices in the plane of the third optical anisotropic layer with respect to a light of a wavelength of 550 nm, Nz3 indicates the main refractive index in the thickness direction of the third optical anisotropic layer with respect to a light of a wavelength of 550 nm, and $Nx3>Ny3=Nz3$; and the fourth optical anisotropic element satisfies requirements [12] and [13] below $$0 \leq Re4 \leq 20 \qquad [12]$$

$$100 \leq Rth4 \leq 400 \qquad [13]$$

wherein Re4 and Rth4 indicate the retardation values in the plane of the fourth optical anisotropic layer and in the thickness direction of the fourth optical anisotropic layer, respectively and are defined by $Re4=(Nx4-Ny4) \times d4$ [nm] and $Rth4=\{(Nx4+Ny4)/2-Nz4\} \times d4$ [nm], respectively wherein d4 indicates the thickness of the fourth optical anisotropic layer, Nx4 and Ny4 indicate the main refractive indices in the plane of the fourth optical anisotropic layer with respect to a light of a wavelength of 550 nm, Nz4 indicates the main refractive index in the thickness direction of the fourth optical anisotropic layer with respect to a light of a wavelength of 550 nm, and $Nx4 \geq Ny4>Nz4$;

(4) the elliptical polarizer according to (1), wherein the first optical anisotropic layer fulfills requirement [1]

$$50 \leq Re1 \leq 300; \qquad [1]$$

(5) the elliptical polarizer according to any one of (1) to (4), wherein the second optical anisotropic layer comprises a homeotropically aligned liquid crystal film produced by aligning and fixing a liquid crystalline composition exhibiting a positive uniaxiality, in a homeotropic alignment while the composition is in the liquid crystal state;

(6) the elliptical polarizer according to (5), wherein the liquid crystalline composition exhibiting a positive uniaxiality comprises a side chain liquid crystalline polymer having an oxetanyl group;

(7) the elliptical polarizer according to any one of (1) to (6), wherein the first and third optical anisotropic layers each comprise a thermoplastic containing a polycarbonate resin or a cyclo-olefin polymer resin;

(8) the elliptical polarizer according to any one of claims (3) to (7), wherein the fourth optical anisotropic layer is a layer formed from at least one type of material selected from the group consisting of polymers such as liquid crystalline compounds, triacetyl cellulose, cyclo-olefin polymers, polyolefins, polyamides, polyimides, polyesters, polyether ketones, polyarylether ketones, polyamide imides, and polyester imides;

(9) the elliptical polarizer according to any one of (1) to (8), wherein the third optical anisotropic layer further satisfies requirement [10] below $$0.7 \leq Re3(450)/Re3(590) \leq 1.05 \quad [10]$$

wherein $Re3(450)$ and $Re3(590)$ indicate the retardation values in the plane of the third optical anisotropic layer with respect to lights of wavelengths of 450 nm and 590 nm, respectively;

(10) the elliptical polarizer according to any one of (1) to (9), wherein the first polarizer and the first optical anisotropic layer are arranged so that the absorption axis of the former is perpendicular or parallel to the slow axis of the latter;

(11) the elliptical polarizer according to any one of (1) to (10), wherein when the angle formed by the absorption axis of the first polarizer and the slow axis of the third optical anisotropic layer is defined as "p", p satisfies $40° \leq p \leq 50°$;

(12) the elliptical polarizer according to any one of (1) to (11), wherein the first polarizer has a supporting layer with a retardation in the thickness direction Rth of greater than zero;

(13) a vertical alignment type liquid crystal display device comprising at least a first polarizer, a first optical anisotropic layer, a second optical anisotropic layer, a third optical anisotropic layer, a vertical alignment type liquid crystal cell comprising a pair of substrates with electrodes and liquid crystal molecules disposed therebetween, the liquid crystal molecules being aligned vertically to the substrates when no electric voltage is applied, a fifth optical anisotropic layer, and a second polarizer, arranged in this order, wherein the first optical anisotropic layer satisfies requirement [1] below $$50 \leq Re1 \leq 500 \quad [1]$$

wherein $Re1$ denotes the retardation value in the plane of the first optical anisotropic layer and is defined by $Re1=(Nx1-Ny1)\times d1$ [nm] wherein $d1$ indicates the thickness of the first optical anisotropic layer, $Nx1$ and $Ny1$ indicate the main refractive indices in the plane of the first optical anisotropic layer with respect to a light of a wavelength of 550 nm, $Nz1$ indicates the main refractive index in the thickness direction of the first optical anisotropic layer with respect to a light of a wavelength of 550 nm, and $Nx1>Nz1\geq Ny1$;

the second optical anisotropic layer satisfies requirements [2] and [3] below $$0 \leq Re2 \leq 20 \quad [2]$$

$$-500 \leq Rth2 \leq -30 \quad [3]$$

wherein $Re2$ and $Rth2$ indicate the retardation values in the plane of the second optical anisotropic layer and in the thickness direction of the second optical anisotropic layer, respectively and are defined by $Re2=(Nx2-Ny2)\times d2$ [nm] and $Rth2=\{(Nx2+Ny2)/2-Nz2\}\times d2$ [nm], respectively wherein $d2$ indicates the thickness of the second optical anisotropic layer, $Nx2$ and $Ny2$ indicate the main refractive indices in the plane of the second optical anisotropic layer with respect to a light of a wavelength of 550 nm, $Nz2$ indicates the main refractive index in the thickness direction of the second optical anisotropic layer with respect to a light of a wavelength of 550 nm, and $Nz2>Nx2\geq Ny2$;

the third optical anisotropic layer satisfies requirement [4] below $$100 \leq Re3 \leq 180 \quad [4]$$

wherein $Re3$ indicates the retardation value in the plane of the third optical anisotropic layer and is defined by $Re3=(Nx3-Ny3)\times d3$ [nm] wherein $d3$ indicates the thickness of the third optical anisotropic layer, $Nx3$ and $Ny3$ indicate the main refractive indices in the plane of the third optical anisotropic layer with respect to a light of a wavelength of 550 nm, $Nz3$ indicates the main refractive index in the thickness direction of the third optical anisotropic layer with respect to a light of a wavelength of 550 nm, and $Nx3>Ny3>Nz3$; and the fifth optical anisotropic layer satisfies requirement [7] below $$100 \leq Re5 \leq 180 \quad [7]$$

wherein $Re5$ indicates the retardation value in the plane of the fifth optical anisotropic layer and is defined by $Re5=(Nx5-Ny5)\times d5$ [nm] wherein $d5$ indicates the thickness of the fifth optical anisotropic layer, $Nx5$ and $Ny5$ indicate the main refractive indices in the plane of the fifth optical anisotropic layer with respect to a light of a wavelength of 550 nm, $Nz5$ indicates the main refractive index in the thickness direction of the fifth optical anisotropic layer with respect to a light of a wavelength of 550 nm, and $Nx5>Ny5=Nz5$;

(14) the vertical alignment type liquid crystal display device according to (13), wherein the third optical anisotropic layer further satisfies requirements [5] and [6] below and the fifth optical anisotropic layer further satisfies requirements [8] and [9] below:

$$50 \leq Rth3 \leq 600 \quad [5]$$

$$0.5 \leq Rth3/Re3 \leq 3.5 \quad [6]$$

$$50 \leq Rth5 \leq 600 \quad [8]$$

$$0.5 \leq Rth5/Re5 \leq 3.5 \quad [9]$$

wherein $Rth3$ indicates the retardation value in the thickness direction of the third optical anisotropic layer and is defined by $Rth3=\{(Nx3+Ny3)/2-Nz3\}\times d3$ [nm], and $Rth5$ indicates the retardation value in the thickness direction of the fifth optical anisotropic layer and is defined by $Rth5=\{(Nx5+Ny5)/2-Nz5\}\times d5$ [nm];

(15) a vertical alignment type liquid crystal display device comprising at least a first polarizer, a second optical anisotropic layer, a third optical anisotropic layer, a vertical alignment type liquid crystal cell comprising a pair of substrates with electrodes and liquid crystal molecules disposed therebetween, the liquid crystal molecules being aligned vertically to the substrates when no electric voltage is applied, a fifth optical anisotropic layer, a first optical anisotropic layer, and a second polarizer, arranged in this order, wherein the first optical anisotropic layer satisfies requirement [1] below $$50 \leq Re1 \leq 500 \quad [1]$$

wherein Re1 denotes the retardation value in the plane of the first optical anisotropic layer and is defined by Re1=(Nx1−Ny1)×d1 [nm] wherein d1 indicates the thickness of the first optical anisotropic layer, Nx1 and Ny1 indicate the main refractive indices in the plane of the first optical anisotropic layer with respect to a light of a wavelength of 550 nm, Nz1 indicates the main refractive index in the thickness direction of the first optical anisotropic layer with respect to a light of a wavelength of 550 nm, and Nx1>Nz1≧Ny1;

the second optical anisotropic layer satisfies requirements [2] and [3] below $$0 \leq Re2 \leq 20 \quad [2]$$

$$-500 \leq Rth2 \leq -30 \quad [3]$$

wherein Re2 and Rth2 indicate the retardation values in the plane of the second optical anisotropic layer and in the thickness direction of the second optical anisotropic layer, respectively and are defined by Re2=(Nx2−Ny2)×d2 [nm] and Rth2={(Nx2+Ny2)/2−Nz2}×d2 [nm], respectively wherein d2 indicates the thickness of the second optical anisotropic layer, Nx2 and Ny2 indicate the main refractive indices in the plane of the second optical anisotropic layer with respect to a light of a wavelength of 550 nm, Nz2 indicates the main refractive index in the thickness direction of the second optical anisotropic layer with respect to a light of a wavelength of 550 nm, and Nz2>Nx2≧Ny2;

the third optical anisotropic layer satisfies requirements [4] to [6] below $$100 \leq Re3 \leq 180 \quad [4]$$

$$50 \leq Rth3 \leq 600 \quad [5]$$

$$0.5 \leq Rth3/Re3 \leq 3.5 \quad [6]$$

wherein Re3 indicates the retardation value in the plane of the third optical anisotropic layer and is defined by Re3=(Nx3−Ny3)×d3 [nm] wherein d3 indicates the thickness of the third optical anisotropic layer, Nx3 and Ny3 indicate the main refractive indices in the plane of the third optical anisotropic layer with respect to a light of a wavelength of 550 nm, Nz3 indicates the main refractive index in the thickness direction of the third optical anisotropic layer with respect to a light of a wavelength of 550 nm, and Nx3>Ny3>Nz3; and the fifth optical anisotropic layer satisfies requirements [7] to [9] below $$100 \leq Re5 \leq 180 \quad [7]$$

$$50 \leq Rth5 \leq 600 \quad [8]$$

$$0.5 \leq Rth5/Re5 \leq 3.5 \quad [9]$$

wherein Re5 indicates the retardation value in the plane of the fifth optical anisotropic layer and is defined by Re5=(Nx5−Ny5)×d5 [nm] wherein d5 indicates the thickness of the fifth optical anisotropic layer, Nx5 and Ny5 indicate the main refractive indices in the plane of the fifth optical anisotropic layer with respect to a light of a wavelength of 550 nm, Nz5 indicates the main refractive index in the thickness direction of the fifth optical anisotropic layer with respect to a light of a wavelength of 550 nm, and Nx5>Ny5=Nz5;

(16) a vertical alignment type liquid crystal display device comprising at least a first polarizer, a first optical anisotropic layer, a second optical anisotropic layer, a third optical anisotropic layer, a fourth optical anisotropic layer, a vertical alignment type liquid crystal cell comprising a pair of substrates with electrodes and liquid crystal molecules disposed therebetween, the liquid crystal molecules being aligned vertically to the substrates when no electric voltage is applied, a fifth optical anisotropic layer, and a second polarizer, arranged in this order, wherein the first optical anisotropic layer satisfies requirement [1] below $$50 \leq Re1 \leq 500 \quad [1]$$

wherein Re1 denotes the retardation value in the plane of the first optical anisotropic layer and is defined by Re1=(Nx1−Ny1)×d1 [nm] wherein d1 indicates the thickness of the first optical anisotropic layer, Nx1 and Ny1 indicate the main refractive indices in the plane of the first optical anisotropic layer with respect to a light of a wavelength of 550 nm, Nz1 indicates the main refractive index in the thickness direction of the first optical anisotropic layer with respect to a light of a wavelength of 550 nm, and Nx1>Nz1≧Ny1;

the second optical anisotropic layer satisfies requirements [2] and [3] below $$0 \leq Re2 \leq 20 \quad [2]$$

$$-500 \leq Rth2 \leq -30 \quad [3]$$

wherein Re2 and Rth2 indicate the retardation values in the plane of the second optical anisotropic layer and in the thickness direction of the second optical anisotropic layer, respectively and are defined by Re2=(Nx2−Ny2)×d2 [nm] and Rth2={(Nx2+Ny2)/2−Nz2}×d2 [nm], respectively wherein d2 indicates the thickness of the second optical anisotropic layer, Nx2 and Ny2 indicate the main refractive indices in the plane of the second optical anisotropic layer with respect to a light of a wavelength of 550 nm, Nz2 indicates the main refractive index in the thickness direction of the second optical anisotropic layer with respect to a light of a wavelength of 550 nm, and Nz2>Nx2≧Ny2;

the third optical anisotropic layer satisfies requirement [4] below $$100 \leq Re3 \leq 180 \quad [4]$$

wherein Re3 indicates the retardation value in the plane of the third optical anisotropic layer and is defined by Re3=(Nx3−Ny3)×d3 [nm] wherein d3 indicates the thickness of the third optical anisotropic layer, Nx3 and Ny3 indicate the main refractive indices in the plane of the third optical anisotropic layer with respect to a light of a wavelength of 550 nm, Nz3 indicates the main refractive index in the thickness direction of the third optical anisotropic layer with respect to a light of a wavelength of 550 nm, and Nx3>Ny3=Nz3;

the fourth optical anisotropic element satisfies requirements [12] and [13] below $$0 \leq Re4 \leq 20 \quad [12]$$

$$100 \leq Rth4 \leq 400 \quad [13]$$

wherein Re4 and Rth4 indicate the retardation values in the plane of the fourth optical anisotropic layer and in the thickness direction of the fourth optical anisotropic layer, respectively and are defined by Re4=(Nx4−Ny4)×d4 [nm] and Rth4={(Nx4+Ny4)/2−Nz4}×d4 [nm], respectively wherein d4 indicates the thickness of the fourth optical anisotropic layer, Nx4 and Ny4 indicate the main refractive indices in the plane of the fourth optical anisotropic layer with respect to a light of a wavelength of 550 nm, Nz4 indicates the main refractive index in the thickness direction of the fourth optical anisotropic layer with respect to a light of a wavelength of 550 nm, and Nx4≧Ny4>Nz4; and the fifth optical anisotropic layer satisfies requirement [7] below $$100 \leq Re5 \leq 180 \quad [7]$$

wherein Re5 indicates the retardation value in the plane of the fifth optical anisotropic layer and is defined by Re5=(Nx5−Ny5)×d5 [nm] wherein d5 indicates the thickness of the fifth optical anisotropic layer, Nx5 and Ny5 indicate the main refractive indices in the plane of the fifth optical anisotropic layer with respect to a light of a wavelength of 550 nm, Nz5 indicates the main refractive index in the thickness direction of the fifth optical anisotropic layer with respect to a light of a wavelength of 550 nm, and Nx5>Ny5=Nz5;

(17) the vertical alignment type liquid crystal display device according to claim 16, wherein the first optical anisotropic layer fulfills requirement [1]

$$50 \leq Re1 \leq 300; \quad [1]$$

(18) a vertical alignment type liquid crystal display device comprising at least a first polarizer, a second optical anisotropic layer, a third optical anisotropic layer, a fourth optical anisotropic layer, a vertical alignment type liquid crystal cell comprising a pair of substrates with electrodes and liquid crystal molecules disposed therebetween, the liquid crystal molecules being aligned vertically to the substrates when no electric voltage is applied, a fifth optical anisotropic layer, a first optical anisotropic layer, and a second polarizer, arranged in this order, wherein
the first optical anisotropic layer satisfies requirement [1] below $$50 \leq Re1 \leq 500 \quad [1]$$

wherein Re1 denotes the retardation value in the plane of the first optical anisotropic layer and is defined by Re1=(Nx1−Ny1)×d1 [nm] wherein d1 indicates the thickness of the first optical anisotropic layer, Nx1 and Ny1 indicate the main refractive indices in the plane of the first optical anisotropic layer with respect to a light of a wavelength of 550 nm, Nz1 indicates the main refractive index in the thickness direction of the first optical anisotropic layer with respect to a light of a wavelength of 550 nm, and Nx1>Nz1≧Ny1;

the second optical anisotropic layer satisfies requirements [2] and [3] below $$0 \leq Re2 \leq 20 \quad [2]$$

$$-500 \leq Rth2 \leq -30 \quad [3]$$

wherein Re2 and Rth2 indicate the retardation values in the plane of the second optical anisotropic layer and in the thickness direction of the second optical anisotropic layer, respectively and are defined by Re2=(Nx2−Ny2)×d2 [nm] and Rth2={(Nx2+Ny2)/2−Nz2}×d2 [nm], respectively wherein d2 indicates the thickness of the second optical anisotropic layer, Nx2 and Ny2 indicate the main refractive indices in the plane of the second optical anisotropic layer with respect to a light of a wavelength of 550 nm, Nz2 indicates the main refractive index in the thickness direction of the second optical anisotropic layer with respect to a light of a wavelength of 550 nm, and Nz2>Nx2≧Ny2;

the third optical anisotropic layer satisfies requirement [4] below $$100 \leq Re3 \leq 180 \quad [4]$$

wherein Re3 indicates the retardation value in the plane of the third optical anisotropic layer and is defined by Re3=(Nx3−Ny3)×d3 [nm] wherein d3 indicates the thickness of the third optical anisotropic layer, Nx3 and Ny3 indicate the main refractive indices in the plane of the third optical anisotropic layer with respect to a light of a wavelength of 550 nm, Nz3 indicates the main refractive index in the thickness direction of the third optical anisotropic layer with respect to a light of a wavelength of 550 nm, and Nx3>Ny3=Nz3;

the fourth optical anisotropic element satisfies requirements [12] and [13] below $$0 \leq Re4 \leq 20 \quad [12]$$

$$100 \leq Rth4 \leq 400 \quad [13]$$

wherein Re4 and Rth4 indicate the retardation values in the plane of the fourth optical anisotropic layer and in the thickness direction of the fourth optical anisotropic layer, respectively and are defined by Re4=(Nx4−Ny4)×d4 [nm] and Rth4={(Nx4+Ny4)/2−Nz4}×d4 [nm], respectively wherein d4 indicates the thickness of the fourth optical anisotropic layer, Nx4 and Ny4 indicate the main refractive indices in the plane of the fourth optical anisotropic layer with respect to a light of a wavelength of 550 nm, Nz4 indicates the main refractive index in the thickness direction of the fourth optical anisotropic layer with respect to a light of a wavelength of 550 nm, and Nx4≧Ny4>Nz4; and the fifth optical anisotropic layer satisfies requirement [7] below $$100 \leq Re5 \leq 180 \quad [7]$$

wherein Re5 indicates the retardation value in the plane of the fifth optical anisotropic layer and is defined by Re5=(Nx5−Ny5)×d5 [nm] wherein d5 indicates the thickness of the fifth optical anisotropic layer, Nx5 and Ny5 indicate the main refractive indices in the plane of the fifth optical anisotropic layer with respect to a light of a wavelength of 550 nm, Nz5 indicates the main refractive index in the thickness direction of the fifth optical anisotropic layer with respect to a light of a wavelength of 550 nm, and Nx5>Ny5=Nz5;

(19) the vertical alignment type liquid crystal display device according to (17) or (18), further comprising a sixth optical anisotropic layer satisfying requirements [14] and [15] below between the vertical alignment type liquid crystal cell and the fifth optically anisotropic layer:

$$0 \leq Re6 \leq 20 \quad [14]$$

$$100 \leq Rth6 \leq 400 \quad [15]$$

wherein Re6 and Rth6 indicate the retardation values in the plane of the sixth optical anisotropic layer and in the thickness direction of the sixth optical anisotropic layer, respectively and are defined by Re6=(Nx6−Ny6)×d6 [nm] and Rth6={(Nx6+Ny6)/2−Nz6}×d6 [nm], respectively wherein d6 indicates the thickness of the sixth optical anisotropic layer, Nx6 and Ny6 indicate the main refractive indices in the plane of the sixth optical anisotropic layer with respect to a light of a wavelength of 550 nm, Nz6 indicates the main refractive index in the thickness direction of the sixth optical anisotropic layer with respect to a light of a wavelength of 550 nm, and Nx6≧Ny6>Nz6;

(20) the vertical alignment type liquid crystal display device according to any one of (13) to (19), wherein the second optical anisotropic layer comprises a homeotropically aligned liquid crystal film produced by aligning and fixing a liquid crystalline composition exhibiting a positive uniaxiality, in a homeotropic alignment while the composition is in the liquid crystal state;

(21) the vertical alignment type liquid crystal display device according to (20), wherein the liquid crystalline composition exhibiting a positive uniaxiality comprises a side chain liquid crystalline polymer having an oxetanyl group;

(22) the vertical alignment type liquid crystal display device according to any one of (13) to (21), wherein the first, third and fifth optical anisotropic layers each comprise a thermoplastic polymer containing a polycarbonate resin or a cyclo-olefin polymer resin;

(23) the vertical alignment type liquid crystal display device according to any one of (13) to (22), wherein the fourth optical anisotropic layer is a layer formed from at least one type of material selected from the group consisting of polymers such as liquid crystalline compounds, triacetyl cellulose, cyclo-olefin polymers, polyolefins, polyamides, polyimides, polyesters, polyether ketones, polyarylether ketones, polyamide imides, and polyester imides;

(24) the vertical alignment type liquid crystal display device according to any one of (13) to (23), wherein the third optical anisotropic layer further satisfies requirement [10] below $$0.7 \leq Re3(450)/Re3(590) \leq 1.05 \quad [10]$$

wherein Re3(450) and Re3(590) indicate the retardation values in the plane of the third optical anisotropic layer with respect to lights of wavelengths of 450 nm and 590 nm, respectively;

(25) the vertical alignment type liquid crystal display device according to any one of (13) to (24), wherein the fifth optical anisotropic layer further satisfies requirement [11] below $$0.7 \leq Re5(450)/Re5(590) \leq 1.05 \quad [11]$$

wherein Re5(450) and Re3(590) indicate the retardation values in the plane of the fifth optical anisotropic layer with respect to lights of wavelengths of 450 nm and 590 nm, respectively;

(26) the vertical alignment type liquid crystal display device according to any one of (13) to (25), wherein the first polarizer and the first optical anisotropic layer are arranged so that the absorption axis of the former is perpendicular or parallel to the slow axis of the latter;

(27) the vertical alignment type liquid crystal display device according to any one of (13) to (26), wherein the third optical anisotropic layer and the fifth optical anisotropic layer are arranged so that the slow axis of the former is perpendicular to the slow axis of the latter;

(28) the vertical alignment type liquid crystal display device according to any one of (13) to (27), wherein when the angle formed by the absorption axis of the first polarizer and the slow axis of the third optical anisotropic layer is defined as "p" and the angle formed by the absorption angle of the second polarizer and the slow axis of the fifth optically anisotropic layer is defined as "q", p satisfies 40°≦p≦50° and q satisfies 40°≦q≦50°;

(29) the vertical alignment type liquid crystal display device according to any one of (13) to (28), wherein the first and second polarizers each have a supporting layer with a retardation in the thickness direction Rth of greater than zero; and

(30) the vertical alignment type liquid crystal display device according to any one of (13) to (29), wherein one of the pair of substrates of the vertical alignment type liquid crystal cell is a substrate having reflection and transmission functions.

Effects of the Invention

The vertical alignment type liquid crystal display device of the present invention is bright in images and capable of displaying images of high contrast in all the directions.

BRIEF DESCRIPTION OF THE DRAWINGS

FIG. 7 is a plan view indicating the angular relations of each of the components of the vertical alignment type liquid crystal display of Example 5.

FIG. 8 is a view indicating the contrast ratio when viewing the vertical alignment type liquid crystal display of Example 5 from all the directions.

FIG. 9 is a schematic sectional view of the transflective vertical alignment type liquid crystal display device used in Example 6.

FIG. 18 is a schematic sectional view of the vertical alignment type liquid crystal display device used in Example 9.

FIG. 19 is a plan view indicating the angular relations of each of the components of the vertical alignment type liquid crystal display of Example 9.

FIG. 20 is a view indicating the contrast ratio when viewing the vertical alignment type liquid crystal display of Example 9 from all the directions. Each of the concentric circles indicate an interval of 20 degrees (the same is applied to the following drawings).

BEST MODE FOR CARRYING OUT THE INVENTION

The present invention will be described below in detail.

Figures 1, 2, 3:
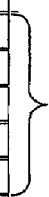
FIG. 1 is a schematic sectional view of an elliptical polarizer according to the present invention.
FIG. 2 is a schematic sectional view of an elliptical polarizer according to the present invention.
FIG. 3 is a schematic sectional view of the vertical alignment type liquid crystal display device used in Example 4.

As shown in FIG. 1, the elliptical polarizer of the present invention comprises at least a first polarizer, a first optical anisotropic layer, a second optical anisotropic layer, and a third optical anisotropic layer, laminated in this order.

Alternatively, as shown in FIG. 2, the elliptical polarizer comprises at least a first polarizer, a first optical anisotropic layer, a second optical anisotropic layer, a third optical anisotropic layer, and further a fourth optical anisotropic layer, laminated in this order.

The vertical alignment type liquid crystal display device of the present invention has a structure of the following (A) or (B) and if necessary may further contain parts such as a light diffusion layer, a light controlling film, a light guiding plate and a prism sheet. There is no particular restriction on the structure of the display device except for using the second optical anisotropic layer comprising a homeotropically-aligned liquid crystal film. With the objective of obtaining optical characteristics with less viewing angle dependency, either (A) or (B) may be used.

(A) first polarizer/first optical anisotropic layer/second optical anisotropic layer/third optical anisotropic layer/(fourth optical anisotropic layer)/vertical alignment type liquid crystal cell/fifth optical anisotropic layer/second polarizer/backlight;

(B) first polarizer/second optical anisotropic layer/third optical anisotropic layer/(fourth optical anisotropic layer)/vertical alignment type liquid crystal cell/fifth optical anisotropic layer/first optical anisotropic layer/second polarizer/backlight The following (C) or (D) structure may be used wherein a sixth optically anisotropic element is inserted between the vertical alignment type liquid crystal cell of the aforesaid vertical alignment type liquid crystal display device and the fifth optically anisotropic layer:

(C) first polarizer/first optical anisotropic layer/second optical anisotropic layer/third optical anisotropic layer/fourth optical anisotropic layer/vertical alignment type liquid crystal cell/sixth optical anisotropic layer/fifth optical anisotropic layer/second polarizer/backlight; or (D) first polarizer/second optical anisotropic layer/third optical anisotropic layer/fourth optical anisotropic layer/vertical alignment type liquid crystal cell/sixth optical anisotropic layer/fifth optical anisotropic layer/first optical anisotropic layer/second polarizer/backlight.

With the above-described structures, 8 sheets of films proposed in Patent Documents 3 and 4 can be decreased to 6 sheets thereby achieving wide viewing angle characteristics while decreasing the production cost.

Constructing parts used in the present invention will be described in turn.

First of all, description will be given of the vertical alignment type liquid crystal cell used in the present invention.

There is no particular restriction on the liquid crystal cell, which may, therefore, be of transmissive, reflective or transflective type. There is no particular restriction on the driving mode of the liquid crystal cell, which may, therefore, be a passive matrix mode used in an STN-LCD, an active matrix mode using active electrodes such as TFT (Thin Film Transistor) electrodes and TFD (Thin Film Diode) electrodes, and a plasma address mode.

There is no particular restriction on the transparent substrates constituting the liquid crystal cell as long as they can align a liquid crystalline material forming a liquid crystal layer in a specific alignment direction. More specific examples include those which themselves have a property of aligning a liquid crystalline material and those which themselves have no capability of aligning but are provided with an alignment layer capable of aligning a liquid crystalline material. The electrode of the liquid crystal cell may be any conventional electrode, such as ITO. The electrode may be usually arranged on the surface of the transparent substrate, which surface contacts the liquid crystal layer. In the case of using a transparent substrate with an alignment layer, an electrode may be provided between the alignment layer and the substrate.

There is no particular restriction on the material exhibiting liquid crystallinity, forming the liquid crystal layer as long as it has a negative dielectric anisotropy. Examples of the material include various low molecular weight liquid crystalline substances, polymeric liquid crystalline substances, and mixtures thereof, which can constitute various liquid crystal cells. The liquid crystalline material may be blended with dyes, chiral dopants, or non-liquid crystalline substances to an extent that they do not prevent the liquid crystal substance from exhibiting liquid crystallinity. If a chiral dopant is added to a vertical alignment type liquid crystal layer containing a liquid crystal material with a negative dielectric anisotropy, rotation of the liquid crystalline molecules upon application of an electric voltage can be stabilized. Further, when the alignment layers in the vicinity of the two substrates are rubbed in different directions, the traces of the alignment treatment are not in the same directions and thus are less visible. When the liquid crystal layer is twisted at an angle of 90 degrees, black display with very little optical leakage is obtained because the tilt directions of the liquid crystal molecules in the vicinity of the two substrates make an angle of 90 degrees, and thus the retardations generated in the tilt directions are counteracted by each other.

Alternatively, replacement of one of the substrates of the vertical alignment type liquid crystal cell with a substrate having a region with a reflection function and a region with a transmission function can convert the cell to a transflective vertical alignment type liquid crystal cell.

There is no particular restriction on the region with a reflection function (which may be hereinafter referred to as "reflection layer") contained in the transflective electrode used in the transflective vertical alignment type liquid crystal cell. Examples of the region include those formed of aluminum, silver, gold, chromium, and platinum, an alloy containing one or more of these metals, an oxide such as magnesium oxide, a multi-layered film of dielectrics, a liquid crystal film exhibiting a selective reflectivity, and combinations thereof. The reflection layer may be flat or curved and may be those provided with diffusive reflectivity by forming rugged patterns on its surface; those having a function as the electrode on the transparent substrate located on the side opposite to the viewer's side; or any combination thereof.

In addition to the above-described components, the vertical alignment type liquid crystal cell used in the present invention may be provided with other additional components. For example, the use of a color filter makes it possible to produce a color liquid crystal display device which can provide multi- or full-colored display images with increased color purity.

Next, description will be given of optical anisotropic layers used in the present invention.

First of all, the first, third and fifth optical anisotropic layers will be described.

Examples of these optical anisotropic layers include birefringence films formed of appropriate polymers such as polycarbonates, norbornene resins, polyvinyl alcohols, polystyrenes, polymethyl methacrylates, polypropylenes, other polyolefins, polyarylates, and polyamides by a uniaxial or biaxial stretching treatment or a technique as disclosed in Japanese Patent Application Laid-Open Publication No. 5-157911 wherein an elongate film is heat-contracted in the width direction using a heat-contractive film to increase the retardation in the thickness direction; aligned films formed of liquid crystal materials such as liquid crystal polymers; and aligned layers of liquid crystal materials supported on a film.

Preferred for the above-mentioned optical anisotropic layers are polycarbonates and norbornene resins.

When the x and y directions are taken in the plane direction and the thickness direction, respectively is defined as z direction, a positive uniaxial optical anisotropic layer has a relation of refraction index defined by nx>ny=nz. A positive biaxial optical anisotropic layer has a relation of refraction index defined by nx>nz>ny. A negative uniaxial optical anisotropic layer has a relation of refraction index defined by nx=ny>nz. A negative biaxial optical anisotropic layer has a relation of refraction index defined by nx>ny>nz.

When the thickness of the first optical anisotropic layer is defined as d1, the main refractive indices in the plane are defined as Nx1 and Ny1, the main refractive index in the thickness direction is defined as Nz1, Nx1>Nz1≧Ny1, and the retardation value in the plane with respect to a light of a wavelength of 550 nm is defined as (Re1=(Nx1−Ny1)×d1 [nm]), the first optical anisotropic layer satisfies the following formula [1]:

$$50 \leq Re1 \leq 500. \quad [1]$$

The first optical anisotropic layer contributes to compensate the viewing angle of a polarizer, and the retardation value (Re1) in the plane of the first optical anisotropic layer with respect to a light of a wavelength of 550 nm is usually from 50 to 500 nm, preferably from 80 to 480 nm, more preferably from 100 to 450 nm. If the Re1 value deviates these ranges, sufficient viewing angle may not be obtained or unnecessary coloration may occur when viewed obliquely.

When the elliptical polarizer of the present invention has at least the first polarizer, first optical anisotropic layer, second optical anisotropic layer, third optical anisotropic layer and fourth optical anisotropic layer, laminated in this order, the formula [1] preferably satisfy the following requirement:

$$50 \leq Re1 \leq 300. \quad [1]$$

That is, in this case, Re1 is usually from 50 to 300 nm, preferably from 80 to 200 nm, more preferably from 100 to 140 nm. If the Re1 value deviate these ranges, sufficient viewing angle may not be obtained or unnecessary coloration may occur when viewed obliquely.

Preferably, the third and fifth optical anisotropic layers exhibit a ¼ wavelength retardation in the plane. When the thicknesses of the third and fifth optical anisotropic layers are defined as d3, d5, respectively, the main refractive indices in the planes are defined as Nx3, Nx5 and Ny3, Ny5, respectively, the main refractive indices in the thicknesses are defined as Nz3 and Nz5, respectively, Nx3>Ny3=Nz3, Nx5>Ny5=Nz5, and the retardation values in the planes with respect to a light of a wavelength of 550 nm are defined as (Re3=(Nx3−Ny3)×d3 [nm]) and (Re5=(Nx5−Ny5)×d5 [nm]), respectively, the third and fifth optical anisotropic layers satisfy the following formulas [4] and [7]:

$$100 \leq Re3 \leq 180 \quad [4]$$

$$100 \leq Re5 \leq 180. \quad [7]$$

Since the third and fifth optical anisotropic layers exhibit a ¼ wavelength retardation, the retardation values (Re3, Re5) in the planes with respect to a light of a wavelength of 550 nm are usually from 100 to 180 nm, preferably from 120 to 160 nm, more preferably 130 to 150 nm. If the Re3 and Re5 values deviate these ranges, sufficient circular polarization may not be attained when used in combination with a polarizer and display characteristics when viewed from the front may be deteriorated.

When the elliptical polarizer of the present invention comprises the first polarizer, first optical anisotropic layer, second optical anisotropic layer and third optical anisotropic layer, laminated in this order, the third optical anisotropic layer preferably satisfies the following formulas [5] and [6] and the fifth optical anisotropic layer preferably satisfies the following formulas [8] and [9]:

$$50 \leq Rth3 \leq 600 \quad [5]$$

$$0.5 \leq Rth3/Re3 \leq 3.5 \quad [6]$$

$$50 \leq Rth5 \leq 600 \quad [8]$$

$$0.5 \leq Rth5/Re5 \leq 3.5 \quad [9]$$

The retardation values (Rth3, Rth5) of the third and fifth optical anisotropic layers in the thickness directions are necessarily set to such conditions that they function as ¼ wavelength plates when viewed from the front and at the same time exhibit a viewing angle compensation effect caused by compensating the retardation in the thickness direction of the vertical alignment type liquid crystal cell. Therefore, the retardation value of the fifth optical anisotropic layer when used alone is from 50 to 600 nm, preferably from 100 to 400 nm, more preferably from 200 to 300 nm though depending on the retardation value in the thickness direction of the vertical alignment type liquid crystal cell. If the retardation value of the fifth optical anisotropic layer deviates these ranges, sufficient viewing angle improving effect may not be attained or unnecessary coloration may occur when viewed obliquely.

The ratio of the retardation values (Rth3, Rth5) in the thickness direction of the third and fifth optical anisotropic layers to those (Re3, Re5) in the plane thereof is usually from 0.5 to 3.5, preferably from 1.0 to 3.0, more preferably from 1.5 to 2.5. If the Rth/Re value deviates from these ranges, sufficient viewing angle improving effect may not be attained or unnecessary coloration may occur when viewed obliquely.

The angle defined by the slow axis of the third optical anisotropic layer and the slow axis of the fifth optical anisotropic layer is usually from 80 to 100 degrees, preferably from 85 to 95 degrees, more preferably about 90 degrees (orthogonal). If the angle deviates these ranges, the contrast when viewed from the front may be decreased.

When the retardation values in the plane of the third and fifth optical anisotropic layers with respect to a light of a wavelength of 450 nm and a light of a wavelength of 590 nm are defined as Re3(450), Re3(590) and Re5(450), Re5(590), respectively, they satisfy the following formulas [10] and [11]:

$$0.7 \leq Re3(450)/Re3(590) \leq 1.05 \quad [10]$$

$$0.7 \leq Re5(450)/Re5(590) \leq 1.05. \quad [11]$$

In order to enhance the contrast characteristics of a transflective vertical alignment type liquid crystal display device upon reflection mode, the dependency on wavelength of the retardation of the ¼ wavelength plate is preferably larger as the wavelength becomes larger or closely constant and the ratio of the retardation values of the third and fifth optical anisotropic layers with respect to a light of wavelength of 450 nm and a light of wavelength of 590 nm (the above formulas [10] and [11]) is usually from 0.7 to 1.05, preferably from 0.75 to 1.0. If the ratio deviates these ranges, the displaying characteristics may be deteriorated, for example, black image becomes bluish when the liquid crystal display device is in the reflection mode.

A circular polarizer has a function to change a linearly polarized light to a circularly polarized light and change a circularly polarized light to a linearly polarized light with a ¼ wavelength plate. Therefore, provision of the third and fifth optical anisotropic layers having a ¼ wavelength retardation in the planes, between the linear polarizer and the vertical alignment type liquid crystal cell enables the transflective vertical alignment type liquid crystal display device to display black images because the retardation in the observing direction is zero when no electric voltage is applied and to display bright images because the retardation in the observing direction occurs when an electric voltage is applied, by arranging the upper and lower polarizers in an orthogonal relation. With the objective of forming a circular polarizer which is the combination of a linear polarizer and a ¼ wavelength plate, the angle p defined by the absorption axis of the first polarizer and the slow axis of the third optical anisotropic layer is usually from 40 to 50 degrees, preferably from 42 to 48 degrees, more preferably about 45 degrees.

Similarly, the angle q defined by the absorption axis of the second polarizer and the slow axis of the fifth optical anisotropic layer is usually from 40 to 50 degrees, preferably from 42 to 48 degrees, more preferably about 45 degrees. The angle deviating these ranges would result in a deterioration in image quality caused by a decrease in the front contrast.

Next, the second optical anisotropic layer will be described.

The second optical anisotropic layer used in the present invention comprises a homeotropically-aligned liquid crystal film produced by aligning homeotropically a liquid crystal material exhibiting a positive uniaxiality while the material is in a liquid crystal state and then fixing the alignment. In the present invention, selection of a liquid crystal material and an alignment substrate is extremely important for producing a liquid crystal film wherein a liquid crystal material is fixed in a homeotropic alignment.

Liquid crystal materials used in the present invention are those containing at least mainly a side chain liquid crystalline polymer such as poly(meth)acrylates and polysiloxanes.

Side chain liquid crystalline polymers used in the present invention are those having at one of its terminal ends a polymerizable oxetanyl group. More specifically, preferred examples include side chain liquid crystalline polymeric compounds produced by homopolymerizing or copolymerizing the (meth)acrylic portion of a (meth)acrylic compound having an oxetanyl group represented by formula (1) below with another (meth)acrylic compound:

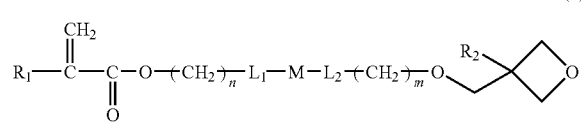

(1)

wherein $R_1$ is hydrogen or methyl, $R_2$ is hydrogen, methyl, or ethyl, $L_1$ and $L_2$ are each a single bond, —O—, —O—CO— or —CO—O—, M is represented by any of formulas (2) to (4) below, and m and n are each an integer of 0 to 10:

 (2)

 (3)

 (4)

wherein $P_1$ and $P_2$ are each a group represented by formula (5) below, $P_3$ is a group represented by formula (6) below, and $L_3$ and $L_4$ are each a single bond, —CH=CH—, —C≡C—, —O—, —O—CO—, or —CO—O—:

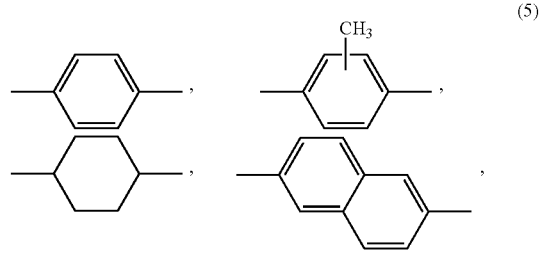

(5)

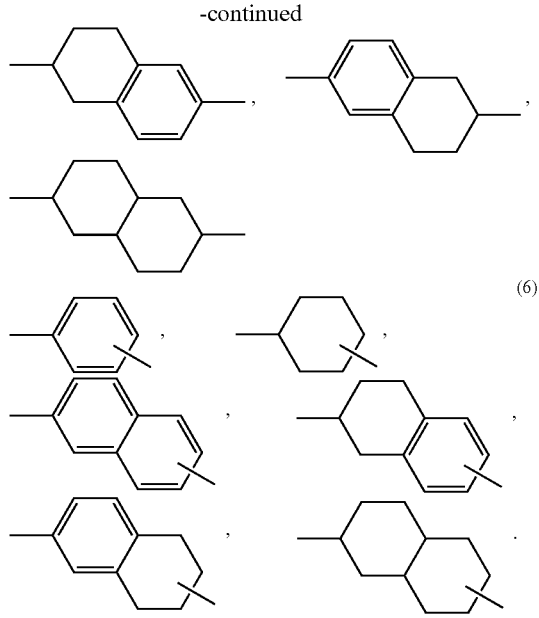

(6)

There is no particular restriction on the method of synthesizing the (meth)acrylic compound having an oxetanyl group represented by formula (1). Therefore, there may be used any conventional method utilized in the field of organic chemistry. For example, a portion having an oxetanyl group is coupled to a portion having a (meth)acrylic group by means of the Williamson's ether synthesis or an ester synthesis using a condensing agent thereby synthesizing a (meth)acrylic compound having two reactive functional groups, i.e., an oxetanyl group and a (meth)acrylic group.

A side chain polymeric liquid crystalline compound containing a unit represented by formula (7) below is produced by homopolymerizing the (meth)acrylic group of a (meth)acrylic compound having an oxetanyl group represented by formula (1) or copolymerizing the same with another (meth)acrylic compound:

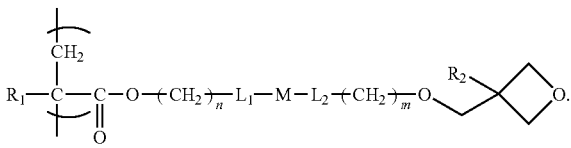

(7)

There is no particular restriction on the polymerization conditions which, therefore, may be those for ordinary radical or anionic polymerization.

As an example of the radical polymerization, a method may be used in which a (meth)acrylic compound is dissolved in a solvent such as dimethylformamide (DMF) and reacted at a temperature of 60 to 120° C. for several hours using 2,2'-azobisisobutylonitrile (AIBN) or benzoyl peroxide (BPO) as an initiator. Alternatively, in order to allow the liquid crystal phase to be stably exhibited there is an effective method in which living radical polymerization is conducted using an initiator such as a copper (I) bromide/2,2'-bipyridyl-based initiator or a 2,2,6,6-tetramethylpiperidinyloxy free radical (TEMPO)-based initiator so as to control the molecular weight distribution. These radical polymerizations are preferably carried out under deoxidation conditions.

As an example of the anionic polymerization, a method may be used in which a (meth)acrylic compound is dissolved in a solvent such as tetrahydrofuran (THF) and reacted using a strong base such as organic lithium compounds, organic sodium compounds or the Grignard reagent as an initiator. Alternatively, this polymerization can be converted to living anionic polymerization by optimizing the initiator or reaction temperature thereby controlling the molecular weight distribution. These anionic polymerizations are needed to be conducted strictly under dehydration and deoxidation conditions.

There is no particular restriction on types of a (meth)acrylic compound added to be copolymerized as long as the resulting polymeric substance exhibits liquid crystallinity. However, preferred are (meth)acrylic compounds having a mesogen group because they can enhance the liquid crystallinity of the resulting polymeric substance. More specifically, particularly preferred are those as represented by the following formulas:

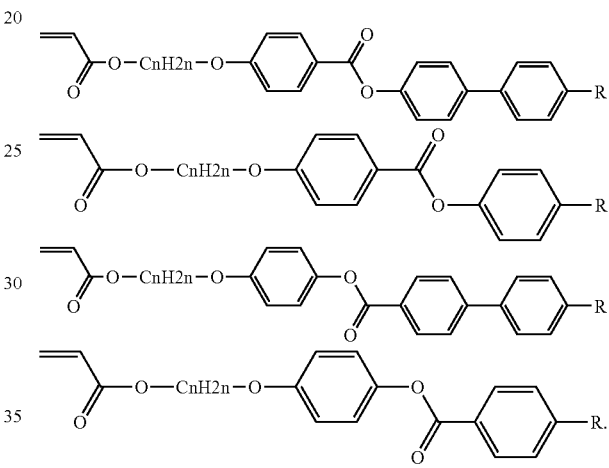

In the above formulas, R is hydrogen, an alkyl group having 1 to 12 carbon atoms, an alkoxy group having 1 to 12 carbon atoms, or a cyano group.

The side chain liquid crystalline polymeric compound used as the liquid crystal material in the present invention contains a unit of formula (7) in an amount of preferably 5 to 100 percent by mole, particularly preferably 10 to 100 percent by mole. The side chain liquid crystalline polymeric compound has a weight average molecular weight of preferably 2,000 to 100,000, particularly preferably 5,000 to 50,000.

Other than the above-described side chain liquid crystalline polymeric compounds, the liquid crystal material used in the present invention may contain various compounds which may be mixed therewith without impairing the liquid crystallinity. Examples of such compounds include those having a cationic polymerizable functional group such as oxetanyl, epoxy, and vinylether groups; various polymeric compounds having a film forming capability; and various low molecular- or polymeric-liquid crystalline compounds exhibiting liquid crystallinity. When the side chain liquid crystalline polymeric compound is used in the form of a composition, the percentage of the compound in the whole composition is preferably 10 percent by mass or more, preferably 30 percent by mass or more, more preferably 50 percent by mass or more. When the side chain liquid crystalline polymeric compound is contained in an amount of less than 10 percent by mass, the concentration of the polymerizable group in the composition will be low, resulting in insufficient mechanical strength after polymerization.

The above-described liquid crystal material is aligned and fixed in a liquid crystal state by polymerizing cationically the oxetanyl group to be cross-linked. Therefore, the liquid crystal material preferably contains a photo- or thermal-cation generator which generates cations with an external stimulus such as light or heat. If necessary, various sensitizers may be used in combination.

The term "photo cation generator" used herein denotes a compound which can generate cations by irradiating a light with a specific wavelength and may be any of organic sulfonium salt-, iodonium salt-, or phosphonium salt-based compounds. Counter ions of these compounds are preferably antimonate, phosphate, and borate. Specific examples include $Ar_3S^+SbF_6^-$, $Ar_3P^+BF_4^-$, and $Ar_2I^+PF_6^-$ wherein Ar indicates a phenyl or substituted phenyl group. Sulfonic acid esters, triazines, diazomethanes, β-ketosulfones, iminosulfonates, and benzoinsulfonates may also be used.

The term "thermal cation generator" used herein denotes a compound which can generate cations by being heated to a certain temperature and may be any of benzylsulfonium salts, benzylammonium salts, benzylpyridinium salts, benzylphosphonium salts, hydrazinium salts, carbonic acid esters, sulfonic acid esters, amineimides, antimony pentachloride-acetyl chloride complexes, diaryliodonium salt-dibenzyloxy coppers, and halogenated boron-tertiary amine adducts.

Since the amount of the cation generator to be added in the polymerizable liquid crystalline composition varies depending on the structures of the mesogen portion or spacer portions constituting the side chain liquid crystalline polymer to be used, the equivalent weight of the oxetanyl group, and the conditions for aligning the composition in a liquid crystal state, it can not be determined with certainty. However, it is within the range of usually 100 ppm by mass to 20 percent by mass, preferably 1,000 ppm by mass to 10 percent by mass, more preferably 0.2 percent by mass to 7 percent by mass, and most preferably 0.5 percent by mass to 5 percent by mass. An amount of the cation generator of less than 100 ppm by mass is not preferable because polymerization may not progress due to the insufficient amount of cation to be generated. An amount of the cation generator of more than 20 percent by mass is not also preferable because a large amount of the undecomposed residue of the cation generator remains in the resulting liquid crystal film and thus the light resistance thereof would be degraded.

The alignment substrate will be described next.

The alignment substrate which may be used in the present invention is preferably a substrate with a flat and smooth surface. Examples of such a substrate include films or sheet formed of organic polymeric materials, glass sheets, and metals. It is preferable to use materials such as organic polymer materials, in view of cost and continuous productivity. Examples of the organic polymeric materials include films formed of transparent polymers, for example, such as polyvinyl alcohols, polyimides, polyphenylene oxides, polyetherketones, polyetheretherketones, polyethylene terephthalates, and polyester-based polymers such as polyethylene naphthalates; cellulose-based polymers such as diacetyl cellulose and triacetyl cellulose; polycarbonate-based polymers; and acryl-based polymers such as polymethyl methacrylates. Further examples include films formed of transparent polymers, for example, styrene-based polymers such as polystyrenes and acrylonitrile styrene copolymers; olefin-based polymers such as polyethylenes, polypropylenes and ethylene propylene copolymers; cyclopolyolefins having a cyclic or norbornene structure; vinyl chloride-based polymers; and amide-based polymers such as nylon and aromatic polyamides. Further examples include films formed of transparent polymers, for example, imide-based polymers; sulfone-based polymers; polyether sulfone-based polymers; polyetheretherketone-based polymers; polyphenylene sulfide-based polymers; vinyl alcohol-based polymers; vinylidene chloride-based polymers; vinyl butyral-based polymers; arylate-based polymers; polyoxymethylene-based polymers; epoxy-based polymers; and blends of these polymers. Among these polymers, it is preferable to use plastic films such as triacetyl cellulose, polycarbonates, and norbornene polyolefins that are used as optical films. Particularly preferable examples of the films of organic polymer materials include plastic films formed of polymer substances having a norbornene structure such as ZEONOR (product name, manufactured by ZEON CORPORATION), ZEONEX (product name, manufactured by ZEON CORPORATION) and ARTON (product name, manufactured by JSR Corporation) because their excellent optical characteristics. Examples of metal films include those formed of aluminum.

In order to obtain the homeotropic alignment stably using the above-described liquid crystal materials, the material forming an alignment substrate preferably has a long chain (usually 4 or more, preferably 8 or more carbon atoms) alkyl group or a layer of a compound having a long chain alkyl group, on a surface of the substrate. It is particularly preferable to form a layer of polyvinyl alcohol having a long chain alkyl group because the layer can be easily formed. The organic polymeric materials may be used alone as an alignment substrate or in the form of film formed on another substrate. In the field of the liquid crystal, a substrate is generally rubbed with cloth for aligning a liquid crystal material, so-called rubbing treatment. However, the homeotropically-aligned liquid crystal film of the present invention has an alignment structure wherein anisotropy in the film plane does not substantially occurs and thus does not always need a rubbing treatment. However, with the objective of restraining the liquid crystal material from being repelled when it is coated on an alignment film, a weak rubbing treatment is preferably carried out. An important set value for regulating the rubbing conditions is a peripheral velocity ratio. The peripheral velocity ratio denotes a ratio of the moving velocity of the rubbing cloth to the moving velocity of the substrate when a rubbing cloth wrapped around a roll is rolled and rubs over a substrate. The weak rubbing treatment denotes a rubbing treatment carried out by rotating the rubbing cloth at a peripheral velocity ratio of usually 50 or less, preferably 25 or less, and particularly preferably 10 or less. A peripheral velocity ratio of greater than 50 would be too strong rubbing effect which fails to align the liquid crystal material in a complete vertical position, which material is tilted toward the plane direction rather than the vertical direction.

Next, a method for producing the homeotropically-aligned liquid crystal film will be described below.

Although not restricted, the liquid crystal film may be produced by spreading the above-described liquid crystal material over the above-described alignment substrate so as to be aligned and fixed in an aligned state by photo-irradiation and/or heat treatment.

Examples of the method of forming a liquid crystal material layer by spreading the liquid crystal material over the alignment substrate include a method wherein the liquid crystal material in a molten state is directly coated over the alignment substrate or a method wherein a solution of the liquid crystal material is coated over the alignment substrate and dried to evaporate the solvent.

There is no particular restriction on the solvent used for preparing the solution as long as it can dissolve the liquid crystal material and be evaporated under appropriate conditions. Preferable examples of the solvent include ketones such as acetone, methyl ethyl ketone, isophorone, and cyclohexanone; ether alcohols such as butoxy ethyl alcohol, hexyloxy ethyl alcohol, and methoxy-2-propanol; glycol ethers such as ethylene glycol dimethylether and diethylene glycol dimethyl ether; esters such as ethyl acetate and ethyl lactate; phenols such as phenol and chlorophenol; amides such as N,N-dimethylformamide, N,N-dimethylacetoamide, and N-methylpyrrolidone; halogens such as chloroform, tetrachloroethane, and dichlorobenzene; and mixtures thereof. Surfactants, defoaming agents, or leveling agents may be added to the solution so as to form a uniform film layer on an alignment substrate.

Regardless of whether the liquid crystal material is coated directly or in the form of a solution, there is no particular restriction on the method of coating the liquid crystal material as long as the uniformity of the film layer can be maintained. For example, there may be used spin coating, die coating, curtain coating, dip coating, and roll coating methods.

The coating of a solution of the liquid crystal material is preferably followed by a drying step for removal of the solvent after coating. There is no particular restriction on the drying step as long as it can maintain the uniformity of the coated film, which may be any conventional method. For example, there may be used a method using a heater (furnace) or a hot air blowing.

The thickness of the liquid crystal film can not be determined with certainty because it depends on the mode of a liquid crystal display device or various optical parameters but is usually from 0.2 µm to 10 µm, preferably from 0.3 µm to 5 µm, more preferably from 0.5 µm to 2 µm. A film thickness of less than 0.2 µm would fail to obtain sufficient viewing angle improving effect or brightness enhancing effect. A film thickness of greater than 10 µm cause unnecessary coloration on a liquid crystal display device.

The liquid crystal material layer formed on the alignment substrate is aligned in a liquid crystal state by a heat treatment or the like and then cured by photo-irradiation and/or a heat treatment so as to be fixed in the alignment. During the first heat treatment, the liquid crystal material is heated to a temperature in such a range that the liquid crystal material exhibits a liquid crystal phase, so as to be aligned by its peculiar self-alignability. Since the conditions for the heat treatment vary in optimum conditions and limits depending on the liquid crystal phase behavior temperature (transition temperature) of the liquid crystal material to be used, it can not be determined with certainty. However, the heat treatment is conducted at a temperature within the range of usually 10 to 250° C., preferably 30 to 160° C., more preferably at a temperature higher than the Tg of the liquid crystal material, more preferably at a temperature higher by 10° C. or higher than the Tg of the liquid crystal material. A too low temperature is not preferable because there is a possibility that the liquid crystal material may not be aligned sufficiently, while a too high temperature is not also preferable because the cationically polymerizable reactive group in the liquid crystal material or an alignment film substrate may be adversely affected. The heat treatment is conducted for usually 3 seconds to 30 minutes and preferably 10 seconds to 10 minutes. A heat treatment for shorter than 3 seconds is not preferable because there is a possibility that the liquid crystal material may not be aligned in a liquid crystal phase completely. Whereas, a heat treatment for longer than 30 minutes is not also preferable because the productivity is diminished.

After the liquid crystal material is aligned in a liquid crystal state by a heating treatment, it is cured (cross-linked) by polymerizing the oxetanyl group therein while being retained in the aligned state. This curing step is carried out for the purpose of fixing the completed liquid crystal alignment by a curing (cross-linking) reaction so that the liquid crystal material is modified into a stronger film.

As described above, since the liquid crystal material used in the present invention has a polymerizable oxetanyl group, it is preferable to use a cationic polymerization initiator (cation generator) for polymerizing (cross-linking) the reactive group. As such a cation generator, a photo-cation generator is preferred to a thermal-cation generator.

In the case of using a photo-cation generator, after addition thereof, the processes up to the heating treatment for aligning the liquid crystal material are conducted under such dark conditions (conditions where light is shielded to an extent that the photo-cation generator does not dissociate) that the liquid crystal material does not cure until subjected to the aligning process and thus can be aligned while maintaining sufficient flowability. Thereafter, a light from a light source capable of emitting an appropriate wavelength of light is irradiated so as to allow the photo-cation generator to generate cations thereby curing the liquid crystal material.

The light irradiation is conducted by irradiating a light from a light source having a spectrum in an absorption wavelength region of the photo-cation generator to be used, such as a metal halide lamp, a high-pressure mercury lamp, a low-pressure mercury lamp, a xenon lamp, an arc discharge lamp, and a laser thereby decomposing the photo-cation generator. The irradiation dose per $cm^2$ is within the range of generally 1 to 2,000 mJ and preferably 10 to 1,000 mJ in the integrated irradiation dose. However, when the absorption region of the photo-cation generator is extremely different from the spectrum of the light source, or the liquid crystal material itself can absorb a light in the wavelength of the light source, the irradiation dose is not limited to the above range. In these cases, a method may be employed in which a suitable photo sensitizer or two or more types of photo-cation generators having different absorption wavelengths may be used.

The temperature upon light irradiation needs to be within such a range that the liquid crystal material is aligned in a liquid crystal phase. Furthermore, the light irradiation is preferably conducted at a temperature which is equal to or higher than the Tg of the liquid crystal material, in order to enhance the efficiency of the curing sufficiently.

The liquid crystal layer produced through the above-described processes becomes a sufficiently solid and strong film. More specifically, since the three-dimensional bond of the mesogen portion is achieved by the curing reaction, the liquid crystal layer is significantly improved not only in heat-resistance (the upper limit temperature at which the liquid crystal phase is maintained) but also in mechanical strength such as resistance to scratch, wear, and cracking compared with that before being cured.

In the case where there arise problems that the alignment substrate to be used is not optically isotropic, the resulting liquid crystal film is opaque at a wavelength region where it is intended to be used, or the alignment substrate is so thick that it causes a problem in practical use, the liquid crystal layer may be transferred to a stretched film having a retardation function. The transferring method may be any conventional method. For example, as disclosed in Japanese Patent Laid-Open Publication Nos. 4-57017 and 5-333313, a method may be used in which after a substrate film different from the alignment substrate, for transferring is laminated via a tacky adhesive or adhesive over a liquid crystal layer on the alignment substrate and if necessary a tacky adhesive or adhesive is coated over the other surface, on which the liquid crystal film layer is not laminated, of the substrate film for transferring and then cured, only the liquid crystal film is transferred on the substrate film for transferring by releasing the alignment substrate.

There is no particular restriction on the tacky adhesive or adhesive to be used for transferring the liquid crystal film as long as it is of optical grade. Therefore, there may be used conventional acrylic-, epoxy-, or urethane-based adhesives.

The homeotropic alignment liquid crystal film produced as described above can be quantified by measuring the optical retardation at an angle wherein the liquid crystal film is tilted from a vertical incidence. The optical retardation value of the homeotropic alignment liquid crystal film is in contrast with respect to the vertical incidence. There may be used various methods for the optical retardation measurement. For example, an automated birefringence measuring device (manufactured by Oji Scientific Instruments) and a polarization microscope may be used. The homeotropic alignment liquid crystal film looks black between crossed nicols polarizers. In this manner, homeotropic alignability was evaluated.

The homeotropically-aligned liquid crystal film used in the present invention is characterized in that when the thickness thereof is defined as d2, the main refractive indices in the plane of the film are defined as Nx2 and Ny2, the main refractive index in the thickness direction is defined as Nz2, and Nz2>Nx2≧Ny2, the retardation value in the plane (Re2=(Nx2−Ny2)×d2 [nm]) and the retardation value in the thickness direction (Rth2={(Nx2+Ny2)/2−Nz2}×d2 [nm]) satisfy the following formulas [2] and [3], respectively:

$$0 \leq Re2 \leq 20 \quad [2]$$

$$-500 \leq Rth2 \leq -30. \quad [3]$$

The Re2 and Rth2 values which are optical parameters of the homeotropically-aligned liquid crystal layer can not be determined with certainty because they depend on the display mode of the liquid crystal display device and various optical parameters. However, with respect to a monochromic light of 550 nm, the retardation value (Re2) in the homeotropic alignment liquid crystal film plane is adjusted to usually from 0 nm to 20 nm, preferably from 0 nm to 10 nm, more preferably from 0 nm to 5 nm and the retardation value (Rth2) in the thickness direction is adjusted to usually from −500 to −30 nm, preferably −400 to −50 nm, more preferably from −400 to −100 nm.

Adjustment of the Re2 and Rth2 values within the above ranges results in a viewing angle improvement film for a liquid crystal display device which can widen the viewing angle while compensating the color tone of the images. When the Re2 value is larger than 20 nm, the front characteristics of the liquid crystal display device would be degraded due to the large front retardation value. When the Rth2 value is larger than −30 nm or smaller than −500 nm, sufficient viewing angle improving effect may not be attained or unnecessary coloration may occur when viewing the device obliquely.

Next, the fourth and sixth optical anisotropic layers are described below.

There is no particular restriction on the fourth or sixth optical anisotropic element. The fourth and sixth optical anisotropic elements may be formed of a non-liquid crystalline material or a liquid crystalline material. Preferable examples of the non-liquid crystalline material include polymers, for example, cellulose triacylate, polyolefins such as ZEONEX and ZEONOR (manufactured by ZEON CORPORATION) and ARTON (manufactured by JSR Corporation), polyamides, polyimides, polyesters, polyetherketones, polyaryletherketones, polyamideimides, and polyesterimides because of their excellent heat resistance, chemical resistance, transparency, and rigidity. These polymers may be used alone or in combination. Alternatively, these polymers may be used in the form of a mixture of two or more of these polymers having different functional groups from each other, such as polyaryletherketone and polyamide. Among these polymers, particularly preferred are polyimides because of their high transparency and alignability. Examples of the liquid crystalline material include cholesterically-aligned film formed from liquid crystal materials such as cholesteric liquid crystal polymers and cholesterically aligned layers of liquid crystal materials supported on a film.

In order to compensate the viewing angle of the vertical alignment type liquid crystal layer of a vertical alignment type liquid crystal cell, the fourth and sixth optical anisotropic layers satisfy the following formulas [12] to [15] when the thicknesses of the fourth and sixth optical anisotropic layers are defined as d4, d6, respectively, the main refractive indices in the planes are Nx4, Nx6 and Ny4, Ny6, respectively, the main refractive indices in the thickness directions are defined as Nz4 and Nz6, respectively, Nx4≧Ny4>Nz4, Nx6≧Ny6>Nz6, and the retardation values in the planes with respect to a light of a wavelength of 550 nm are defined as (Re4=(Nx4−Ny4)×d4 [nm] and Rth4={(Nx4+Ny4)/2−Nz4}×d4 [nm], and Re6=(Nx6−Ny6)×d6 [nm] and Rth6={(Nx6+Ny6)/2−Nz6}×d6 [nm]), respectively:

$$0 \leq Re4 \leq 20 \quad [12]$$

$$100 \leq Rth4 \leq 400 \quad [13]$$

$$0 \leq Re6 \leq 20 \quad [14]$$

$$100 \leq Rth6 \leq 400. \quad [15]$$

The retardation values (Re4, Re6) in the planes of the fourth and sixth optical anisotropic layers can not be determined with certainty because they depend on the optical thickness of a vertical alignment type liquid crystal cell or the birefringence Δn of a liquid crystal material used in therein. However, they are usually from 0 to 20 nm, preferably from 0 to 10 nm, more preferably from 0 to 5 nm. If the Re4 and Re6 values deviate from these ranges, the contrast when viewed from the front may be decreased. The retardation values (Rth4, Rth6) in the thickness directions of the fourth and sixth optical anisotropic layers are usually from 150 to 400 nm, preferably from 180 to 360 nm, more preferably from 200 to 300 nm when only the fourth optical anisotropic layer is used, because the retardation value in the thickness direction of the vertical alignment type liquid crystal cell is usually from 200 to 400 nm. When the fourth and sixth optical anisotropic layers are used in combination, the retardation value in the thickness direction of each of the layers is usually from 75 to 200 nm, preferably from 90 to 180 nm, more preferably from 100 to 150 nm because the total values of Re4 and Re6 values are usually from 150 to 400 nm, preferably from 180 to 360 nm, more preferably from 200 to 300 nm. If the values deviate these ranges, sufficient viewing angle improving effect may not be attained or unnecessary coloration may occur when viewing the device obliquely.

The linear polarizer used in the present invention is usually a linear polarizer having a protection film on one or both surface of a polarizer. There is no particular restriction on the polarizer. There may be used various polarizers. Examples of the polarizer include those obtained by stretching uniaxially a hydrophilic polymer film such as a polyvinyl alcohol-based film, a partially formalized polyvinyl alcohol-based film or an ethylene-vinyl acetate copolymer-based partially saponified film to which a dichroic substance such as iodine or a dichroic dye is allowed to absorb; and polyene-based alignment films such as dehydrated products of polyvinyl alcohol and dehydrochlorinated products of polyvinyl chloride. Among these polarizers, it is suitable to use those produced by stretching and aligning a polyvinyl alcohol-based film to which a dichroic substance (iodine or dye) is allowed to absorb. There is no particular restriction on the thickness of the polarizer. It is, however, general to use a polarizer with a thickness of 5 to 80 µm.

The polarizer wherein a polyvinyl alcohol is dyed with iodine and uniaxially stretched may be produced by dipping a polyvinyl alcohol in an aqueous solution of iodine to be dyed and stretching it 3 to 7 times longer than the original length. If necessary, the polyvinyl alcohol-based film may be dipped in a solution of boric acid or potassium iodide. Further if necessary, the polyvinyl alcohol-based film may be dipped in water to be washed before dyeing. Washing of the polyvinyl alcohol-based film can remove stains thereon and a blocking inhibitor and swells the film thereby providing an effect to prevent uneven dyeing. Stretching may be carried out after or while dyeing with iodine or followed by dyeing with iodine. Alternatively, stretching may be carried out in an aqueous solution of boric acid or iodine or a water bath.

The protection film to be arranged on one or both surfaces of the polarizer are preferably excellent in transparency, mechanical strength, thermal stability, moisture shielding capability, and isotropy. Examples of materials of the protection film include polyester-based polymers such as polyethylene terephthalate and polyethylene naphthalate; cellulose-based polymers such as diacetyl cellulose and triacetyl cellulose; acryl-based polymers such as polymethyl methacrylate; styrene-based polymers such as polystyrene and acrylonitrile styrene copolymers (AS resin); and polycarbonate-based polymers. Another examples include polyolefin-based polymers such as polyethylene-, polypropylene- and cycloolefin-based polyolefins, polyolefins having a norbornene structure, and ethylene propylene copolymers; vinyl chloride-based polymers; amide-based polymers such as nylon and aromatic polyamides; imide-based polymers; sulfone-based polymers; polyether sulfone-based polymers; polyetheretherketone-based polymers; polyphenylene sulfide-based polymers; vinyl alcohol-based polymers; vinylidene chloride-based polymers; vinyl butyral-based polymers; arylate-based polymers; polyoxymethylene-based polymers; epoxy-based polymers; and blends of these polymers. Another examples include those produced by forming acryl-, urethane-, acrylurethane-, epoxy-, and silicone-based thermal or ultraviolet curing type resins, into film shapes. The thickness of the protection film is generally 500 µm or less, preferably from 1 to 300 µm, particularly preferably from 5 to 200 µm.

The protective film is preferably a substrate that is optically isotropic. Examples of such a substrate include triacetyl cellulose (TAC) films such as Fujitac (manufactured by Fuji Photo Film Co., Ltd.) and Konicatac (manufactured by Konica Minolta Opto, Inc.); cycloolefin-based polymers such as Arton film (manufactured by JSR), ZEONOR film and Zeonex film (both manufactured by Zeon Corp.); TPX film (manufactured by Mitsui Chemical Inc.); and Acryplene film (manufactured by Mitsubishi Rayon Co., Ltd.). Triacetyl cellulose and cycloolefin-based polymers are preferably used in view of flatness, heat resistance or humidity resistance when they are used for an elliptical polarizer.

When the protection film is arranged on both surface of the polarizer, the protection film on the top surface may be formed with the same or different polymer of the protection film on the bottom surface. The polarizer is attached to the protection film via a water-based tacky adhesive. Examples of the water-based tacky adhesive include polyvinyl alcohol-based adhesives, gelatin-based adhesives, vinyl-based latex, water-based polyurethanes, and water-based polyesters.

The protection film may be subjected to hard coat or anti-reflection treatment or various treatments for the purposes of anti-sticking, diffusion, or anti-glare.

The hard coat treatment is carried out for preventing scratching on the polarizing film surfaces by forming a curable film with excellent hardness or slipping characteristics, with a suitable acryl- or silicone-based ultraviolet curing resin, on the protection film surface. The anti-reflection treatment is carried out for preventing external light from reflecting on a polarizing film surface and may be achieved by forming an anti-reflection film in accordance with a conventional manner. The anti-sticking treatment is carried out for preventing adhesion between the adjacent layers.

The anti-glare treatment is carried out for preventing the inhibition of visibility of a light transmitting through the polarizing film caused by the reflection of the natural light on a polarizing film surface, by forming fine irregularities on a protection film surface by roughing such as sand blasting or embossing or by blending transparent fine particles. Examples of the fine particles to be blended for forming the fine irregularity on the protection film surface include transparent fine particles, for example, inorganic fine particles of an average particle diameter of 0.5 to 50 µm, which may be electrically conductive, such as silica, alumina, titania, zirconia, tin oxide, indium oxide, cadmium oxide, and antimony oxide and organic fine particles such as cross-linked or uncross-linked polymers. When the fine irregularity is formed on the protection film surface, the amount of the fine particles is usually from 2 to 50 parts by weight, preferably from 5 to 25 parts by weight, on the basis of 100 parts by weight of the transparent resin forming the fine surface irregularity. The anti-glare layer may also be a diffusion layer (having a function of enlarging the viewing angle) for enlarging the light transmitting through the polarizing film and thus enlarging the viewing angle.

The anti-reflection layer, anti-sticking layer, diffusion layer and anti-glare layer may be formed integrally on the protection film or may be formed as an additional optical layer separately from the transparent protection layer.

The first, second, third, fourth, fifth and sixth optical anisotropic layers and the polarizer may be attached to each other via a tacky adhesive layer. There is no particular restriction on a tacky adhesive forming the tacky adhesive layer. There may be used any tacky adhesive appropriately selected from those containing a polymer such as an acrylic polymer, a silicone-based polymer, a polyester, a polyurethane, a polyamide, a polyether, a fluorine- or rubber-based polymer as a base polymer. In particular, it is preferable to use a tacky adhesive such as an acrylic tacky adhesive which is excellent in optical transparency and in weather resistance and heat resistance and exhibits tackiness characteristics such as moderate wetness, cohesivity and adhesivity.

The formation of the tacky adhesive layer may be carried out by any suitable method. As an example, there is a method wherein a base polymer or a composition thereof is dissolved or dispersed in a solvent containing toluene or ethyl acetate alone or in combination thereby obtaining a tacky adhesive solution containing 10 to 40 percent by mass of the adhesive, which solution is then directly laid over the above-described substrate or liquid crystal film by an appropriate developing method such as casting or coating or alternatively wherein a tacky adhesive layer is formed in accordance with the method as described above on a separator and then transferred onto the liquid crystal layer. The tacky adhesive layer may contain additives such as natural or synthetic resins, in particular fillers or pigments containing tackiness-imparting resins, glass fibers, glass beads, metal powders, and other inorganic powders, dyes, anti-oxidants. The tacky adhesive layer may contain fine particles so as to exhibit light diffusivity.

When each of the optical anisotropic layers are attached to other optical anisotropic layer via a tacky adhesive layer, they may be subjected to a surface treatment so as to enhance the adhesion to the tacky adhesive layer. There is no particular restriction on the method of the surface treatment. There may be suitably used a surface treatment such as corona discharge, sputtering, low-pressure UV irradiation, or plasma treatment, which can maintain the transparency of the liquid crystal film surface. Among these surface treatments, corona discharge treatment is excellent.

EXAMPLES

The present invention will be further described in the following examples, but the present invention should not be construed as being limited thereto.

The analyzing methods used in the examples are as follows.

(1) $^1$H-NMR Measurement

A compound was dissolved in deuterated chloroform and was determined by means of $^1$H-NMR at 400 MHz (INOVA-400 manufactured by Varinat Co., Ltd.).

(2) GPC Measurement

The GPC measurement was carried out to determine the number-average molecular weight (Mn) and weight-average molecular weight (Mw) of a liquid crystalline polymer by dissolving the compound in tetrahydrofuran, using 8020 GPC system manufactured by TOSOH CORPORATION equipped with TSK-GEL, Super H1000, Super H2000, Super H3000, and Super H4000 which are connected in series and tetrahydrofuran as an eluent solvent. Polystyrene was used as a standard for calibration of the molecular weight.

(3) Observation Through Microscope

The liquid crystal aligned state was observed using an Olympus BH2 polarizing microscope.

(4) Parameter Measurement of Liquid Crystal Film

The measurement was carried out using an automatic birefringence analyzer KOBRA21ADH manufactured by Oji Scientific Instruments.

Example 1

A liquid crystalline polymer represented by formula (8) below was synthesized. With regard to the molecular weight in terms of polystyrene, Mn=8000 and Mw=15000. The representation in formula (8) indicates the structural ratio of the monomer but does not mean a block copolymer.

(8)

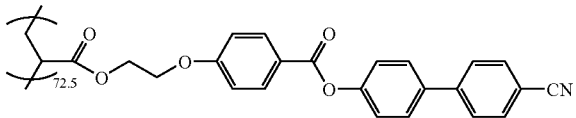

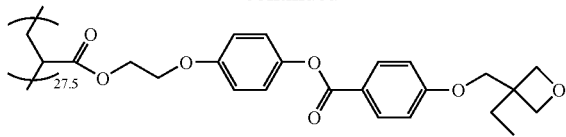

In 9 ml of cyclohexanone was dissolved 1.0 g of the polymer of formula (8), followed by addition of 0.1 g of a propylene carbonate solution of 50 percent of triarylsulfonium hexafluoroantimonate (a reagent manufactured by Aldrich Co.) at a dark place and filtration of insolubles with a polytetrafluoroethylene filter with a pore size of 0.45 μm thereby obtaining a liquid crystal material solution.

An alignment substrate was prepared as follows. A polyethylene terephthalate film with a thickness of 38 μm (manufactured by TEIJIN LIMITED) was cut into a size of 15 cm square and spin-coated with a solution of 5 percent by mass of an alkyl-modified polyvinyl alcohol (PVA: MP-203 manufactured by KURARAY CO., LTD.) (solvent is a mixed solvent of water and isopropyl alcohol at a mass ratio of 1:1). The coated film was dried on a hot plate kept at 50° C. for 30 minutes and heated at 120° C. in an oven for 10 minutes. The PVA layer was rubbed with a rayon cloth. The thickness of the resulting PVA layer was 1.2 μm. The rubbing peripheral velocity ratio (the moving velocity of the rubbing cloth/the moving velocity of the substrate film) was set to 4.

On the resulting alignment substrate was spin-coated the liquid crystal material solution obtained above. The coated alignment substrate was dried on a hot plate kept at 60° C. for 10 minutes and heated at 150° C. in an oven for 2 minutes thereby aligning the liquid crystal material. The sample was placed on an aluminum plate heated at 60° C., making contact therewith and irradiated with an ultraviolet light of 600 mJ/cm$^2$ (measured at 365 nm) using a high pressure mercury lamp thereby curing the liquid crystal material.

Since the polyethylene terephthalate film used as a substrate was large in birefringence and thus not preferable for an optical film, the resulting liquid crystal film on the alignment substrate was transferred via an ultraviolet curing type adhesive onto a triacetylcellulose (TAC) film. More specifically, the adhesive with a thickness of 5 μm was coated over the cured liquid crystal material layer on the polyethylene terephthalate film and laminated with a TAC film. After the laminate was subjected to an irradiation of ultraviolet light from the TAC film side so as to cure the adhesive, the polyethylene terephthalate film was released.

As the result of observation of the resulting optical film (PVA layer/liquid crystal layer/adhesive layer/TAC film) through a polarizing microscope, it was confirmed that the film was aligned in a monodomain uniform aligned state having no disclination. As the result of observation of the optical film through a conoscope, it was confirmed that the alignment was a homeotropic alignment having a positive uniaxial refraction structure. As the result of measurement using KOBRA21ADH, the combination of the TAC film and the liquid crystal layer was found to have a retardation in the plane direction (Re2) of 0.5 nm and a retardation in the thickness direction (Rth2) of −295 nm. The TAC film itself had a negative uniaxiality and a retardation in the plane of 0.5 nm and a retardation in the thickness direction of +35 nm. Therefore, it was assessed that the liquid crystal layer itself had a retardation Re of 0 nm and a retardation Rth of −260 nm. In Example 4 and the following examples thereof, when the optical film was attached to a vertical alignment type liquid crystal display device, the TAC film was removed and only the homeotropically-aligned liquid crystal layer was used.

Example 2

An optical film was produced in accordance with the same procedures of Example 1 except for changing the thickness of the homeotropically-aligned liquid crystal film. As the result of measurement using KOBRA21ADH, the combination of the TAC film and the liquid crystal layer was found to have a retardation in the plane direction (Re2) of 0.5 nm and a retardation in the thickness direction (Rth2) of −235 nm. The TAC film itself had a negative uniaxiality and a retardation in the plane of 0.5 nm and a retardation in the thickness direction of +35 nm. Therefore, it was assessed that the liquid crystal layer itself had a retardation Re of 0 nm and a retardation Rth of −200 nm. In Example 4 and the following examples thereof, when the optical film was attached to a vertical alignment type liquid crystal display device, the TAC film was removed and only the homeotropically-aligned liquid crystal layer was used.

Example 3

An optical film was produced in accordance with the same procedures of Example 1 except for changing the thickness of the homeotropically-aligned liquid crystal film. As the result of measurement using KOBRA21ADH, the combination of the TAC film and the liquid crystal layer was found to have a retardation in the plane direction (Re2) of 0.5 nm and a retardation in the thickness direction (Rth2) of −165 nm. The TAC film itself had a negative uniaxiality and a retardation in the plane of 0.5 nm and a retardation in the thickness direction of +35 nm. Therefore, it was assessed that the liquid crystal layer itself had a retardation Re of 0 nm and a retardation Rth of −130 nm. In Example 4 and the following examples thereof, when the optical film was attached to a vertical alignment type liquid crystal display device, the TAC film was removed and only the homeotropically-aligned liquid crystal layer was used.

Example 4

The vertical alignment type liquid crystal display device of Example 4 will be described with reference to FIGS. 3 and 4.

A transparent electrode 10 formed of an ITO layer with high transmissivity was formed on a substrate 8, and a counter electrode 9 was formed on a substrate 7. Between the transparent electrode 10 and the counter electrode 9 was sandwiched a liquid crystal layer 11 formed of a liquid crystal material exhibiting a negative dielectric anisotropy.

On the contacting surfaces between the liquid crystal layer 11 and the transparent electrode 10 and the counter electrode 9 were formed alignment layers with vertical alignability (not shown), at least one of which had been subjected to an aligning treatment such as rubbing after being coated.

The liquid crystal molecules in the liquid crystal layer 11 had a tilt angle of 1 degree due to the alignment treatment such as rubbing on the alignment layer.

Because of the use of the liquid crystal material exhibiting a negative dielectric anisotropy for the liquid crystal layer 11, the liquid crystal molecules tilted toward the parallel direction upon application of an electric voltage between the transparent electrode 10 and the counter electrode 9.

As the liquid crystal material for the liquid crystal layer 11 was used a liquid crystal material having a refractive index anisotropy wherein Ne (refractive index to extraordinary light)=1.561, No (refractive index to ordinary light)=1.478, and ΔN(Ne−No)=0.083, and the cell gap was 4.7 µm.

A linear polarizer 1 (thickness: about 105 µm, SQW-062 manufactured by Sumitomo Chemical Co., Ltd.) was arranged above the displaying side (upper side of the drawing) of the vertical alignment type liquid crystal cell 6. Between the upper linear polarizer and the liquid crystal cell 6 were arranged a first optical anisotropic layer 2 (ZEONOR manufactured by ZEON CORPORATION), a second optical anisotropic layer 3 formed of the homeotropically-alignment liquid crystal film prepared in Example 1, and a third optical anisotropic layer 4 (ZEONOR manufactured by ZEON CORPORATION). A linear polarizer 13 (thickness: about 105 µm, SQW-062 manufactured by Sumitomo Chemical Co., Ltd.) was arranged below the rear side (lower side of the drawing) of the vertical alignment type liquid crystal cell 6. Between the lower linear polarizer 13 and the liquid crystal cell 6 was arranged a fifth optical anisotropic layer 12 (ZEONOR manufactured by ZEON CORPORATION). The Rth of triacetyl cellulose used as a supporting substrate for the linear polarizers (SQW-062 manufactured by Sumitomo Chemical Co., Ltd.) was 35 nm.

Figure 4:
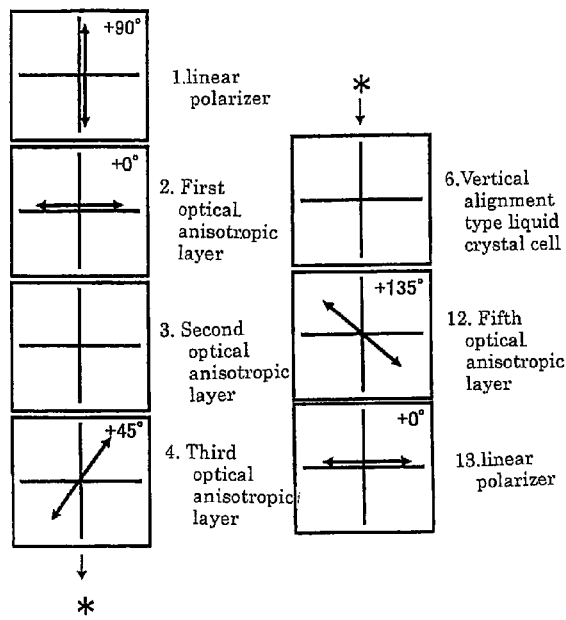
FIG. 4 is a plan view indicating the angular relations of each of the components of the vertical alignment type liquid crystal display of Example 4.

The absorption axis orientations of the linear polarizers 1, 13 were set to 90 degrees and 0 degree in the plane, respectively, as indicated by arrows in FIG. 4. The first optical anisotropic layer 2 was formed of an optical element having an optical axis in the plane and a positive uniaxial optical anisotropy. The slow axis orientation of the first optical anisotropic layer 2 was set to 0 degree, as indicated by an arrow in FIG. 4, and the layer 2 had a retardation in the plane Re1 of 80 nm.

The third and fifth optical anisotropic layers 4, 12 were each formed of an optical element having an optical axis in the plane and a negative biaxial optical anisotropy. The slow axis orientations of the third and fifth optical anisotropic layers 4, 12 were set to 45 degrees and 135 degrees, respectively, as indicated by arrows in FIG. 4, and the layers 4, 12 had retardations Re3, Re5 of 137.5 nm and retardations Rth3, Rth5 of 275 nm.

The second optical anisotropic layer 3 formed of the homeotropically-aligned liquid crystal film had a retardation Re2 of 0 nm and a retardation Rth2 of −260 nm.

Figure 5:
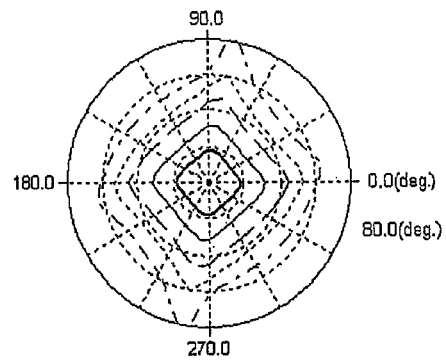
FIG. 5 is a view indicating the contrast ratio when viewing the vertical alignment type liquid crystal display of Example 4 from all the directions.

FIG. 5 shows the contrast ratio from all the directions defined by the transmissivity ratio of black image 0V and white image 5V "(white image)/(black image)". The contrast contour lines indicate 1000, 500, 200, 100 and 50 from the innermost. The concentric circles indicate angles of an interval of 20 degrees from the center. Therefore, the outermost circle indicates 80 degrees (the same is applied to the subsequent drawings).

Example 5

Figure 6:
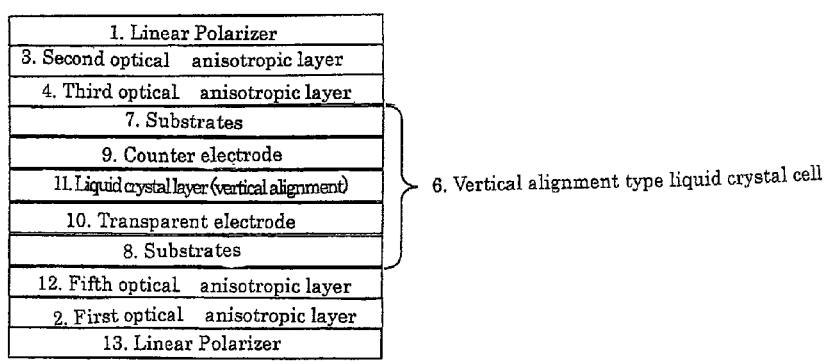
FIG. 6 is a schematic sectional view of the vertical alignment type liquid crystal display device used in Example 5.

The vertical alignment type liquid crystal display device of Example 5 will be described with reference to FIGS. 6 and 7.

A vertical alignment type liquid crystal display device was produced in accordance with the procedures of Example 4 except that the position of the first optical anisotropic layer 2 was shifted from between the linear polarizer 1 and the second optical anisotropic layer 3 to between the fifth optical anisotropic layer 12 and the linear polarizer 13 and the slow axis orientation of the first optical anisotropic layer 2 was set to 90 degrees. The homeotropically-aligned liquid crystal film prepared in Example 2 was used as the second optical anisotropic layer 3.

The slow axis orientation of the first optical anisotropic layer 2 was set to 90 degrees, as indicated by an arrow in FIG.

7, and the layer 2 had a retardation Re1 of 410 nm. The slow axis orientations of the third and fifth optical anisotropic layers 4, 12 were set to 45 degrees and 135 degrees, as indicated by arrows in FIG. 7, and the layers 4, 12 had retardations Re3, Re5 of 137.5 nm and retardations Rth3, Rth5 of 275 nm. The second optical anisotropic layer 3 had a retardation Rth2 of −200 nm.

FIG. 8 shows the contrast ratio from all the directions defined by the transmissivity ratio of black image 0V and white image 5V "(white image)/(black image)".

Example 6

A transflective vertical alignment type liquid crystal display device was produced in accordance with the procedures of Example 4 except that a transflective vertical alignment type liquid crystal display device described below was produced and PURE-ACE WRF-W manufactured by TEIJIN LIMITED was used for forming the third and fifth optical anisotropic layers 4, 12 in place of ZEONOR manufactured by ZEON CORPORATION.

Figure 10:
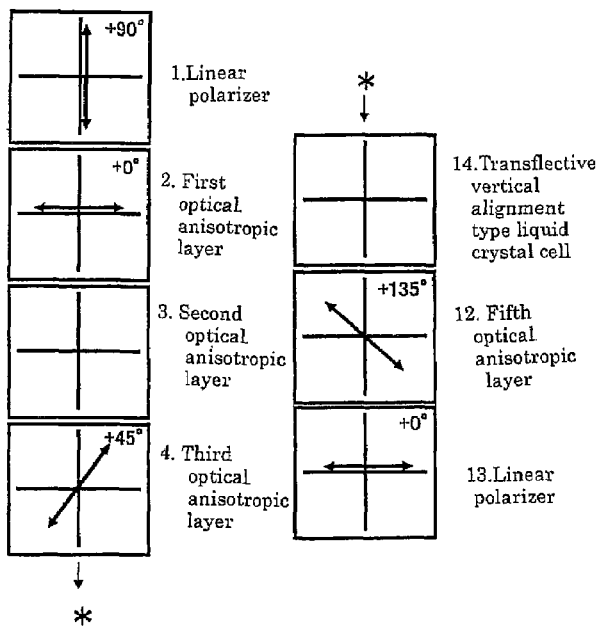
FIG. 10 is a plan view indicating the angular relations of each of the components of the transflective vertical alignment type liquid crystal display of Example 6.

The transflective vertical alignment type liquid crystal display device will be described with reference to FIGS. 9 and 10.

A reflective electrode 15 formed of an Al layer with high reflectivity and a transparent electrode 10 formed of an ITO layer with high transmissivity were formed on a substrate 8, and a counter electrode 9 was formed on a substrate 7. Between the reflective and transparent electrodes 15, 10 and the counter electrode 9 was sandwiched a liquid crystal layer 11 formed of a liquid crystal material exhibiting a negative dielectric anisotropy.

On the contacting surfaces between the liquid crystal layer 11 and the reflective and transparent electrodes 15, 10 and the counter electrode 9 were formed alignment layers with vertical alignability (not shown), at least one of which had been subjected to a aligning treatment such as rubbing after being coated.

The liquid crystal molecules in the liquid crystal layer 11 had a tilt angle of 1 degree due to the alignment treatment such as rubbing on the alignment layer with vertical alignability.

Because of the use of the liquid crystal material exhibiting a negative dielectric anisotropy for the liquid crystal layer 11, the liquid crystal molecules tilted toward the parallel direction upon application of an electric voltage between the reflective and transparent electrodes 15, 10 and the counter electrode 9.

As the liquid crystal material for the liquid crystal layer 11 was used the same material as that used in Example 4. The cell gaps at the reflective electrode part and at the transparent electrode part were 2.4 μm and 4.7 μm, respectively.

The slow axis orientations of PURE-ACE WRF-Ws manufactured by TEIJIN LTD, used for forming the third and fifth optical anisotropic layers 4, 12 were set to 45 degrees and 135 degrees, respectively. The third and fifth optical anisotropic layers 4, 12 had retardations Re3, Re5 of 137.5 nm and retardations Rth3, Rth5 of 275 nm, respectively, that are the same as those in Example 4.

Figure 11:
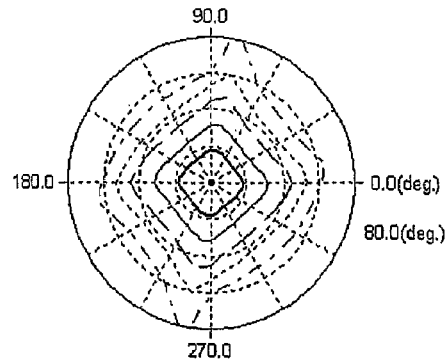
FIG. 11 is a view indicating the contrast ratio when viewing the transflective vertical alignment type liquid crystal display of Example 6 from all the directions.

FIG. 11 shows the contrast ratio from all the directions defined by the transmissivity ratio of black image 0V and white image 5V "(white image)/(black image)".

Comparative Example 1

Figure 12:
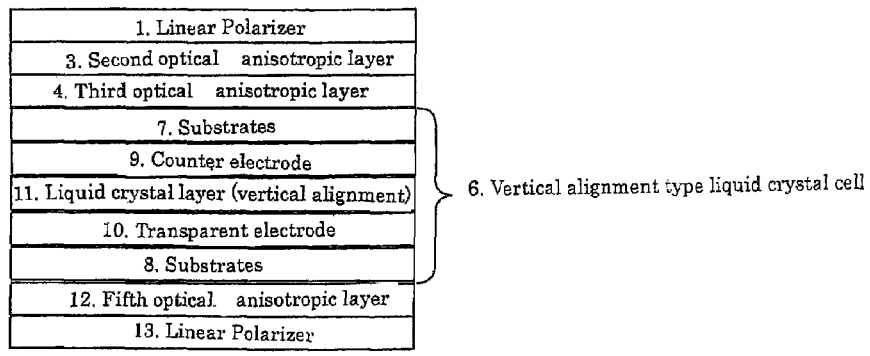
FIG. 12 is a schematic sectional view of the vertical alignment type liquid crystal display device used in Comparative Example 1.

A vertical alignment type liquid crystal display device shown in FIG. 12 was produced in accordance with the procedures of Example 4 except that the first optical anisotropic layer 2 was excluded.

Figure 13:
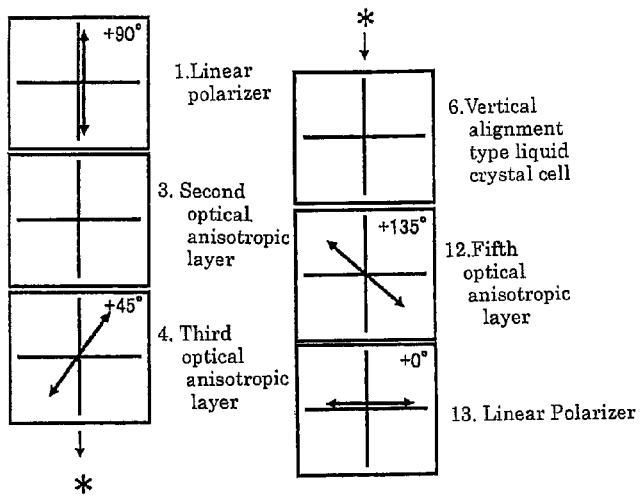
FIG. 13 is a plan view indicating the angular relations of each of the components of the vertical alignment type liquid crystal display of Comparative Example 1.

FIG. 13 shows the relation of angle in each component. The third and fifth optical anisotropic layers 4, 12 had retardations Re3, Re5 of 137.5 nm and retardations Rth3, Rth5 of 275 nm, respectively. The Rth2 value of the second optical anisotropic layer 3 was optimized to be widest in viewing angle characteristics and was set to −260 nm, which was the same as that in Example 4. The homeotropically-aligned liquid crystal film produced in Example 1 was used as the second optical anisotropic layer 3.

Figure 14:
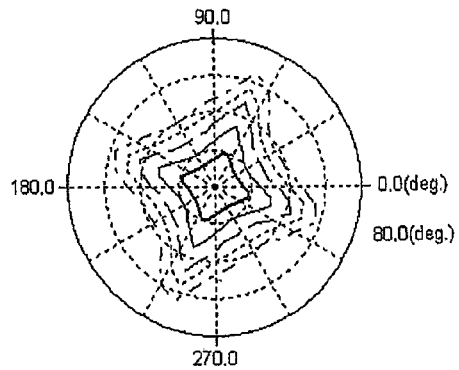
FIG. 14 is a view indicating the contrast ratio when viewing the vertical alignment type liquid crystal display of Comparative Example 1 from all the directions.

FIG. 14 shows the contrast ratio from all the directions defined by the transmissivity ratio of black image 0V and white image 5V "(white image)/(black image)".

As the result of comparison between the contrast contours in the all direction shown in FIGS. 5 and 8 and those in FIG. 14, it was found that the viewing angle characteristics were extremely improved by adding the first optical anisotropic layer 2.

Comparative Example 2

Figure 15:
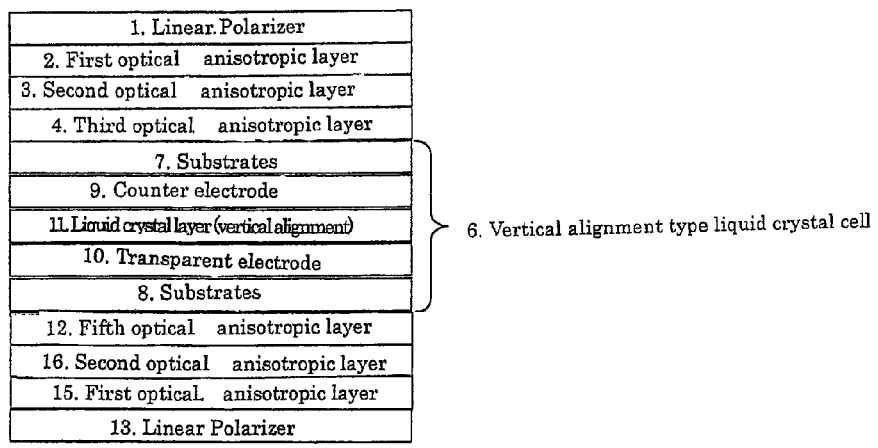
FIG. 15 is a schematic sectional view of the vertical alignment type liquid crystal display device used in Comparative Example 2.

The vertical alignment type liquid crystal display device of Comparative Example 2 will be described with reference to FIGS. 15 and 16.

The vertical alignment type liquid crystal cell 6 was the same as that used in Example 4.

A linear polarizer 1 (thickness: about 105 μm, SQW-062 manufactured by Sumitomo Chemical Co., Ltd.) was arranged above the displaying side (upper side of the drawing) of the vertical alignment type liquid crystal cell 6. Between the upper linear polarizer 1 and the liquid crystal cell 6 were arranged a first optical anisotropic layer 2 (ZEONOR manufactured by ZEON CORPORATION), a second optical anisotropic layer 3 formed of the homeotropically-alignment liquid crystal film prepared in Example 3, and a third optical anisotropic layer 4 (ZEONOR manufactured by ZEON CORPORATION). A linear polarizer 13 (thickness: about 105 μm, SQW-062 manufactured by Sumitomo Chemical Co., Ltd.) was arranged below the rear side (lower side of the drawing) of the vertical alignment type liquid crystal cell 6. Between the lower linear polarizer 13 and the liquid crystal cell 6 were arranged a first optical anisotropic layer 15 (ZEONOR manufactured by ZEON CORPORATION), a second optical anisotropic layer 16 formed of the homeotropically-alignment liquid crystal film prepared in Example 3 and a fifth optical anisotropic layer 12 (ZEONOR manufactured by ZEON CORPORATION).

Figure 16:
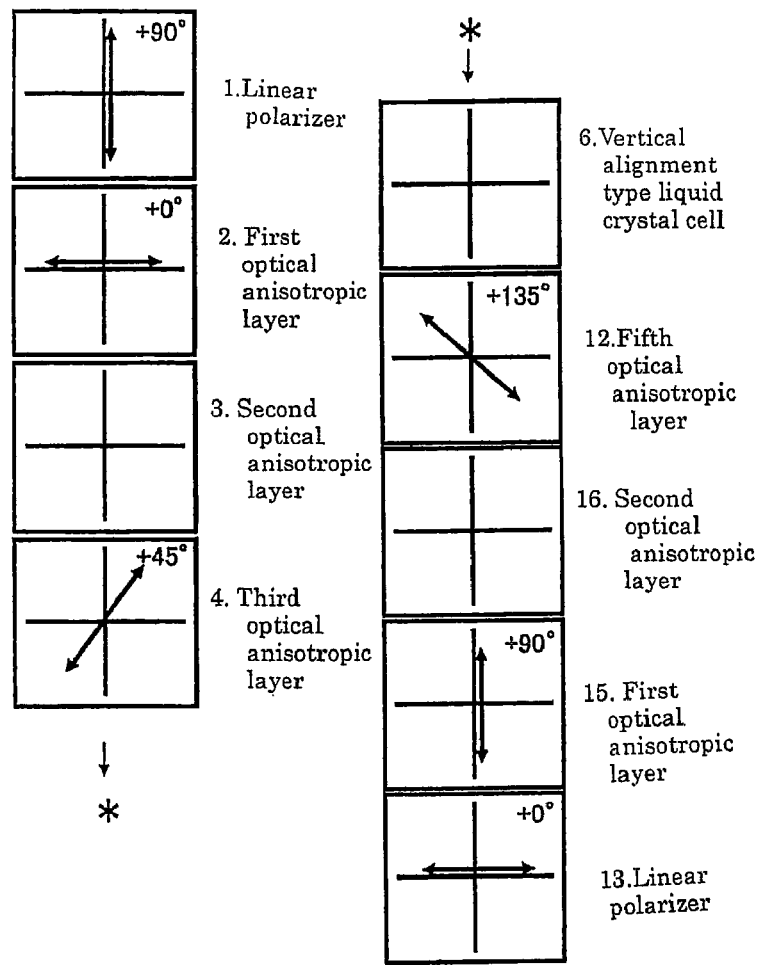
FIG. 16 is a plan view indicating the angular relations of each of the components of the vertical alignment type liquid crystal display of Comparative Example 2.

The absorption axis orientations of the linear polarizers 1, 13 were set to 90 degrees and 0 degree in the plane, respectively, as indicated by arrows in FIG. 16. The first optical anisotropic layer 2 was formed of an optical element having an optical axis in the plane and a positive uniaxial optical anisotropy. The slow axis orientation of the first optical anisotropic layer 2 was set to 0 degree, as indicated by an arrow in FIG. 16, and the layer 2 had a retardation Re1 of 80 nm. The slow axis orientation of the first optical anisotropic layer 15 was set to 0 degree, as indicated by an arrow in FIG. 16, and the layer 15 had a retardation Re1 of 80 nm.

The third and fifth optical anisotropic layers 4, 12 were each formed of an optical element having an optical axis in the plane and a negative biaxial optical anisotropy. The slow axis orientations of the third and fifth optical anisotropic layers 4, 12 were set to 45 degrees and 135 degrees, respectively, as indicated by arrows in FIG. 16, and the layers 4, 12 had retardations Re3, Re5 of 137.5 nm and retardations Rth3, Rth5 of 275 nm.

The second optical anisotropic layer 3 formed of the homeotropically-aligned liquid crystal film had a retardation Re2 of 0 nm and a retardation Rth2 of −130 nm.

Figure 17:
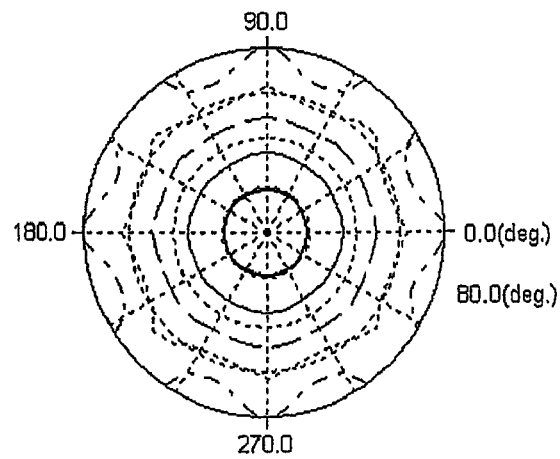
FIG. 17 is a view indicating the contrast ratio when viewing the vertical alignment type liquid crystal display of Comparative Example 2 from all the directions.

FIG. 17 shows the contrast ratio from all the directions defined by the transmissivity ratio of black image 0V and white image 5V "(white image)/(black image)".

As the result of comparison between the contrast contours in the all direction shown in FIGS. 5 and 8 and those in FIG. 17, it was found that substantially equal viewing angle characteristics were obtained and thus changing component arrangement to that as defined by the present invention was able to decrease the number of films resulting in a decrease in the cost and thickness of the device, maintaining viewing angle characteristics.

Example 7

An optical film was produced in accordance with the procedures of Example 1 except for changing the thickness of the homeotropically-aligned liquid crystal film. As the result of measurement using KOBRA21ADH, the combination of the TAC film and the liquid crystal layer was found to have a retardation in the plane direction (Re2) of 0.5 nm and a retardation in the thickness direction (Rth2) of −230 nm. The TAC film itself had a negative uniaxiality and a retardation in the plane of 0.5 nm and a retardation in the thickness direction of +35 nm. Therefore, it was assessed that the liquid crystal layer itself had a retardation Re of 0 nm and a retardation Rth of −195 nm. In Example 10 and the following examples thereof, when the optical film was attached to a vertical alignment type liquid crystal display device, the TAC film was removed and only the homeotropically-aligned liquid crystal layer was used.

Example 8

An optical film was produced in accordance with the procedures of Example 1 except for changing the thickness of the homeotropically-aligned liquid crystal film. As the result of measurement using KOBRA21ADH, the combination of the TAC film and the liquid crystal layer was found to have a retardation in the plane direction (Re2) of 0.5 nm and a retardation in the thickness direction (Rth2) of −225 nm. The TAC film itself had a negative uniaxiality and a retardation in the plane of 0.5 nm and a retardation in the thickness direction of +35 nm. Therefore, it was assessed that the liquid crystal layer itself had an Re of 0 nm and an Rth of −90 nm.

Example 9

The vertical alignment type liquid crystal display device of Example 9 will be described with reference to FIGS. 18 and 19.

A transparent electrode 10 formed of an ITO layer with high transmissivity was formed on a substrate 8, and a counter electrode 9 was formed on a substrate 7. Between the transparent electrode 10 and the counter electrode 9 was sandwiched a liquid crystal layer 11 formed of a liquid crystal material exhibiting a negative dielectric anisotropy.

On the contacting surfaces between the liquid crystal layer 11 and the transparent electrode 10 and the counter electrode 9 were formed alignment layers with vertical alignability (not shown), at least one of which had been subjected to an aligning treatment such as rubbing after being coated.

The liquid crystal molecules in the liquid crystal layer 11 had a tilt angle of 1 degree due to the alignment treatment such as rubbing on the alignment layer.

Because of the use of the liquid crystal material exhibiting a negative dielectric anisotropy for the liquid crystal layer 11, the liquid crystal molecules tilted toward the parallel direction upon application of an electric voltage between the transparent electrode 10 and the counter electrode 9.

As the liquid crystal material for the liquid crystal layer 11 was used a liquid crystal material having a refractive index anisotropy wherein Ne (refractive index to extraordinary light)=1.561, No (refractive index to ordinary light)=1.478, and ΔN(Ne−No)=0.083, and the cell gap was 4.7 μm.

A linear polarizer 1 (thickness: about 105 μm, SQW-062 manufactured by Sumitomo Chemical Co., Ltd.) was arranged above the displaying side (upper side of the drawing) of the vertical alignment type liquid crystal cell 6. Between the upper linear polarizer 1 and the liquid crystal cell 6 were arranged a first optical anisotropic layer 2 (ZEONOR manufactured by ZEON CORPORATION), a second optical anisotropic layer 3 formed of the homeotropically-alignment liquid crystal film prepared in Example 7, a third optical anisotropic layer 4 (ZEONOR manufactured by ZEON CORPORATION) and a fourth optical anisotropic layer 5 (AR-TON manufactured by JSR Corporation). A linear polarizer 13 (thickness: about 105 μm, SQW-062 manufactured by Sumitomo Chemical Co., Ltd.) was arranged below the rear side (lower side of the drawing) of the vertical alignment type liquid crystal cell 6. Between the lower linear polarizer 13 and the liquid crystal cell 6 was arranged a fifth optical anisotropic layer 12 (ZEONOR manufactured by ZEON CORPORATION). The Rth of triacetyl cellulose used as a supporting substrate for the linear polarizers (SQW-062 manufactured by Sumitomo Chemical Co., Ltd.) was 35 nm.

The first, third and fifth optical anisotropic layers 2, 4 and 12 were each formed of an optical element having an optical axis in the plane and a positive uniaxial optical anisotropy. The absorption axis orientations of the linear polarizers 1, 13 were set to 90 degrees and 0 degree in the plane, respectively, as indicated by arrows in FIG. 19. The slow axis orientation of the first optical anisotropic layer 2 was set to 0 degree, as indicated by an arrow in FIG. 19, and the layer 2 had a retardation Re1 of 105 nm. The slow axis orientations of the third and fifth optical anisotropic layers 4, 12 were set to 45 degrees and 135 degrees, respectively, as indicated by arrows in FIG. 19, and the layers 4, 12 had retardations Re3, Re5 of 137.5 nm.

The fourth optical anisotropic layer 5 had a retardation Re4 of about 0 nm and a retardation Rth4 of 280 nm.

The second optical anisotropic layer 3 formed of the homeotropically-aligned liquid crystal film had a retardation Re2 of 0 nm and a retardation Rth2 of −195 nm.

FIG. 20 shows the contrast ratio from all the directions defined by the transmissivity ratio of black image 0V and white image 5V "(white image)/(black image)".

Example 10

Figure 21:
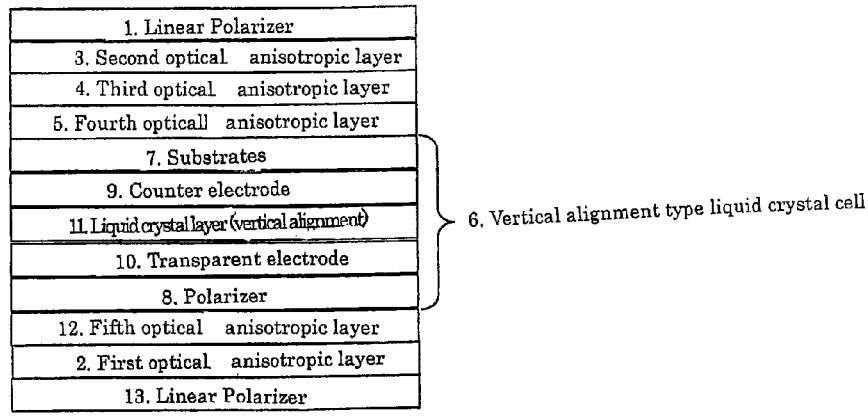
FIG. 21 is a schematic sectional view of the vertical alignment type liquid crystal display device used in Example 10.
Figure 22:
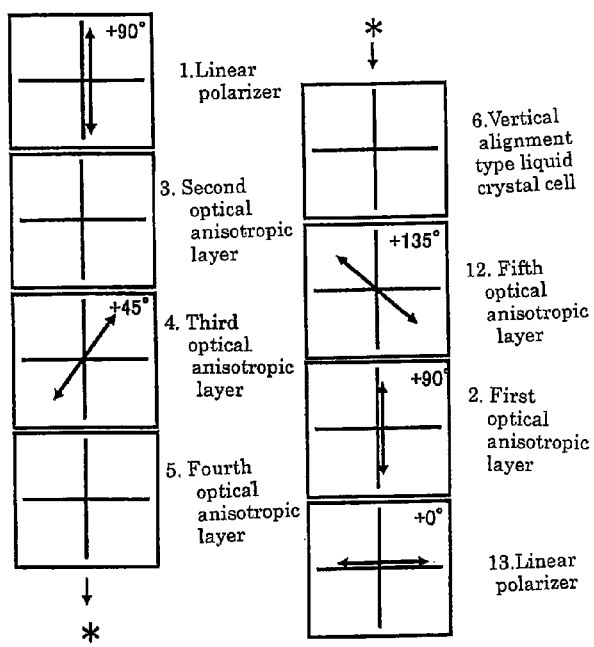
FIG. 22 is a plan view indicating the angular relations of each of the components of the vertical alignment type liquid crystal display of Example 10.

The vertical alignment type liquid crystal display device of Example 10 will be described with reference to FIGS. 21 and 22. The vertical alignment type liquid crystal display device was produced in accordance with the procedures of Example 9 except that the homeotropically-aligned liquid crystal film produced in Example 7 was used as a second optical anisotropic layer 3, the position of the first optical anisotropic layer 2 was shifted from between the linear polarizer 1 and the second optical anisotropic layer 3 to between the fifth optical anisotropic layer 12 and the linear polarizer 13 and the slow axis orientation of the first optical anisotropic layer 2 was set to 90 degrees.

Figure 23:
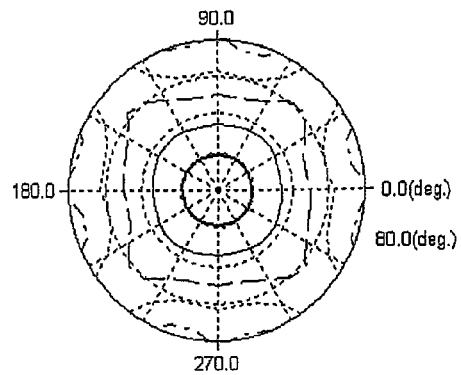
FIG. 23 is a view indicating the contrast ratio when viewing the vertical alignment type liquid crystal display of Example 10 from all the directions.

FIG. 23 shows the contrast ratio from all the directions defined by the transmissivity ratio of black image 0V and white image 5V "(white image)/(black image)".

Example 11

A transflective vertical alignment type liquid crystal display device was produced in accordance with the procedures of Example 9 except that a transflective vertical alignment type liquid crystal display device described below was produced and PURE-ACE WRF-W manufactured by TEIJIN LIMITED was used for forming the third and fifth optical anisotropic layers 4, 12 in place of ZEONOR manufactured by ZEON CORPORATION.

Figure 24:
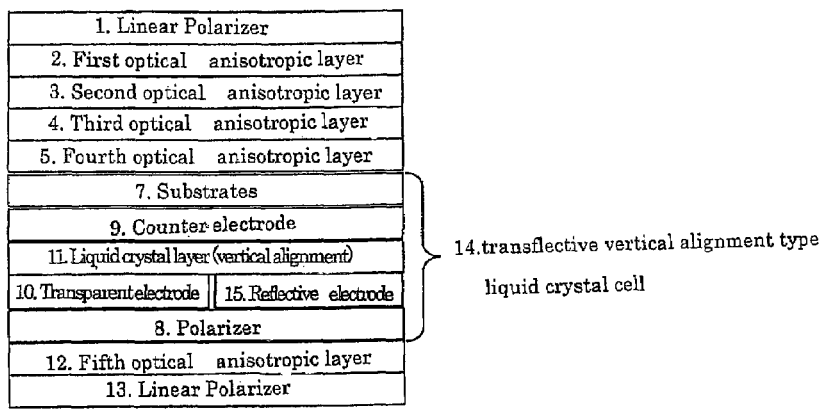
FIG. 24 is a schematic sectional view of the transflective vertical alignment type liquid crystal display device used in Example 11.
Figure 25:
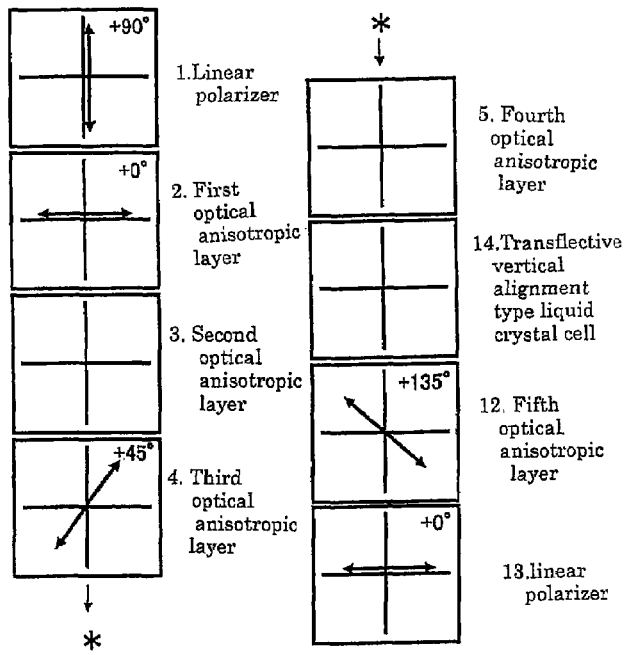
FIG. 25 is a plan view indicating the angular relations of each of the components of the transflective vertical alignment type liquid crystal display of Example 11.

The transflective vertical alignment type liquid crystal display device will be described with reference to FIGS. 24 and 25.

A reflective electrode 15 formed of an Al layer with high reflectivity and a transparent electrode 10 formed of an ITO layer with high transmissivity were formed on a substrate 8, and a counter electrode 9 was formed on a substrate 7. Between the reflective and transparent electrodes 15, 10 and the counter electrode 9 was sandwiched a liquid crystal layer 11 formed of a liquid crystal material exhibiting a negative dielectric anisotropy.

On the contacting surfaces between the liquid crystal layer 11 and the reflective and transparent electrodes 15, 10 and the counter electrode 9 were formed alignment layers with vertical alignability (not shown), at least one of which had been subjected to a aligning treatment such as rubbing after being coated.

The liquid crystal molecules in the liquid crystal layer 11 had a tilt angle of 1 degree due to the alignment treatment such as rubbing on the alignment layer with vertical alignability.

Because of the use of the liquid crystal material exhibiting a negative dielectric anisotropy for the liquid crystal layer 11, the liquid crystal molecules tilted toward the parallel direction upon application of an electric voltage between the reflective and transparent electrodes 15, 10 and the counter electrode 9.

As the liquid crystal material for the liquid crystal layer 11 was used the same material as that used in Example 9. The cell gaps at the reflective electrode part and at the transparent electrode part were 2.4 μm and 4.7 μm, respectively.

The slow axis orientations of PURE-ACE WRF-Ws manufactured by TEIJIN LTD, used for forming the third and fifth optical anisotropic layers 4, 12 were set to 45 degrees and 135 degrees, respectively. The third and fifth optical anisotropic layers 4, 12 had retardations Re3, Re5 of 137.5 nm, that are the same as those in Example 9.

Figure 26:
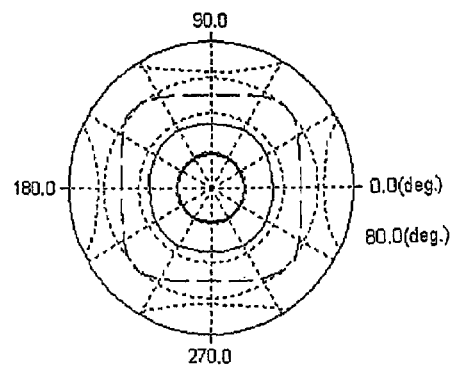
FIG. 26 is a view indicating the contrast ratio when viewing the transflective vertical alignment type liquid crystal display of Example 11 from all the directions.

FIG. 26 shows the contrast ratio from all the directions defined by the transmissivity ratio of black image 0V and white image 5V "(white image)/(black image)".

Example 12

Figure 27:
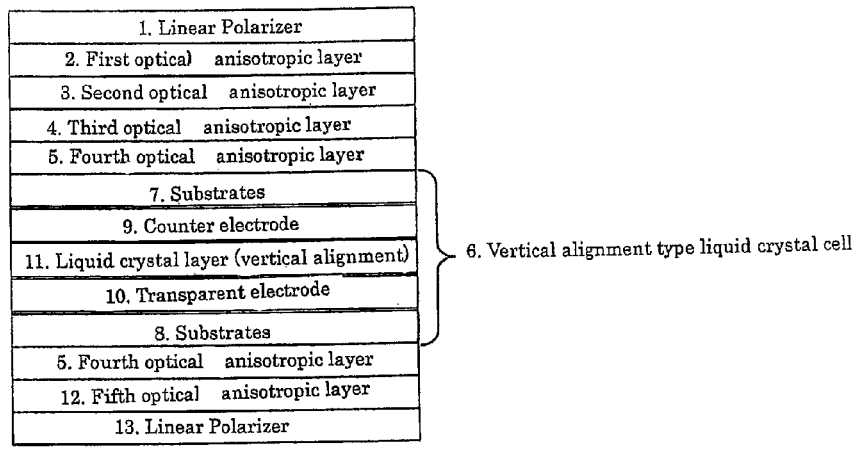
FIG. 27 is a schematic sectional view of the transflective vertical alignment type liquid crystal display device used in Example 12.
Figure 28:
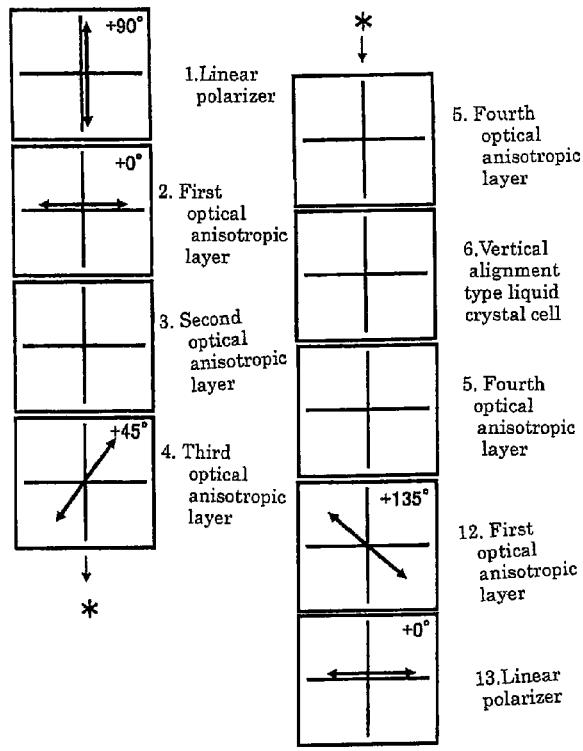
FIG. 28 is a plan view indicating the angular relations of each of the components of the transflective vertical alignment type liquid crystal display of Example 12.

The vertical alignment type liquid crystal display device of Example 12 will be described with reference to FIGS. 27 and 28. The vertical alignment type liquid crystal display device was produced in accordance with the procedures of Example 9 except that the homeotropically-aligned liquid crystal film produced in Example 7 was used as a second optical anisotropic layer 3, and another fourth optical anisotropic layer 5 used in Example 9 was arranged between the vertical alignment type liquid crystal cell 6 and the fifth optical anisotropic layer 12. These two fourth optical anisotropic layers had a retardation Re4 of about 0 nm and a retardation Rth4 of 140 nm.

Figure 29:
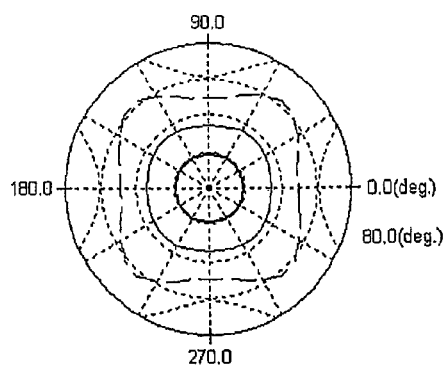
FIG. 29 is a view indicating the contrast ratio when viewing the transflective vertical alignment type liquid crystal display of Example 12 from all the directions.

FIG. 29 shows the contrast ratio from all the directions defined by the transmissivity ratio of black image 0V and white image 5V "(white image)/(black image)".

Comparative Example 3

Figure 30:
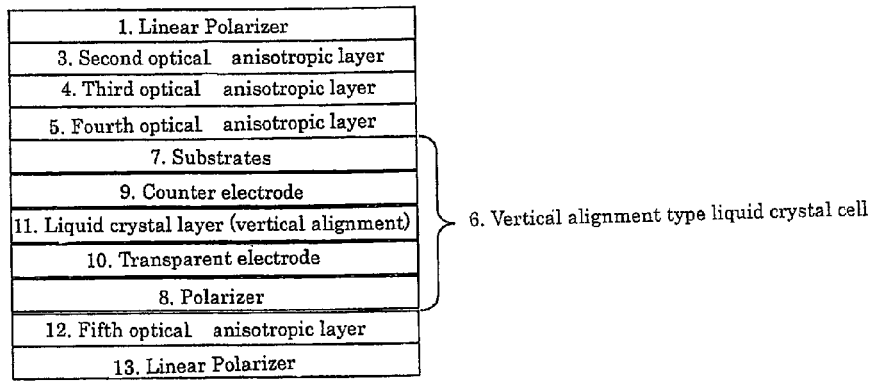
FIG. 30 is a schematic sectional view of the vertical alignment type liquid crystal display device used in Comparative Example 3.

A vertical alignment type liquid crystal display device shown in FIG. 30 was produced in accordance with the procedures of Example 9 except that the first optical anisotropic layer 2 was excluded.

Figure 31:
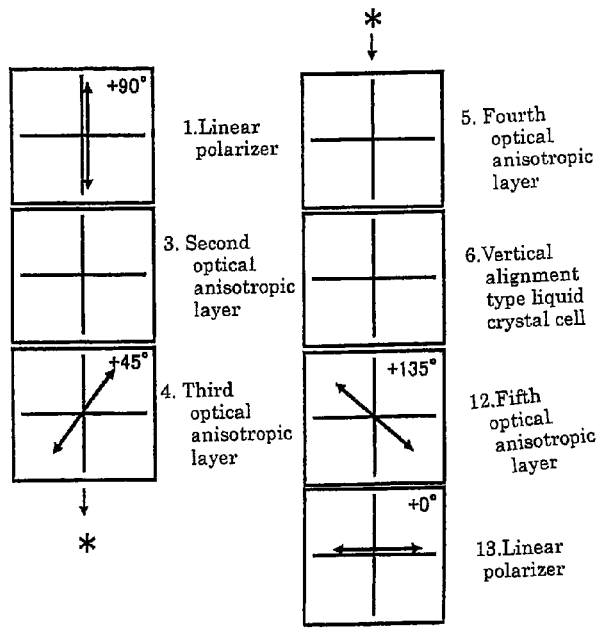
FIG. 31 is a plan view indicating the angular relations of each of the components of the vertical alignment type liquid crystal display of Comparative Example 3.

FIG. 31 shows the relation of angle in each component. The third and fifth optical anisotropic layers 4, 12 had retardations Re3, Re5 of 137.5 nm. The Rth2 and Rth4 values of the second and fourth optical anisotropic layers 3, 5 were optimized to be widest in viewing angle characteristics and were set to −90 nm and 130 nm, respectively. The homeotropically-aligned liquid crystal film produced in Example 8 was used as the second optical anisotropic layer 3.

Figure 32:
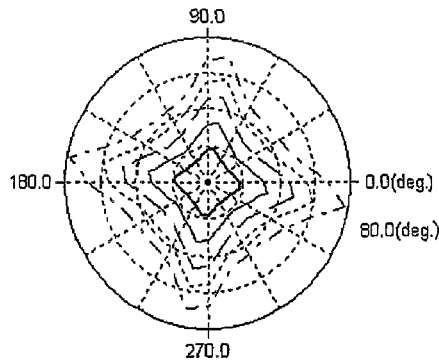
FIG. 32 is a view indicating the contrast ratio when viewing the vertical alignment type liquid crystal display of Comparative Example 3 from all the directions.

FIG. 32 shows the contrast ratio from all the directions defined by the transmissivity ratio of black image 0V and white image 5V "(white image)/(black image)".

As the result of comparison between the contrast contours in the all direction shown in FIGS. 20 and 23 and those in FIG. 32, it was found that the viewing angle characteristics were extremely improved by adding the first optical anisotropic layer 2.

Comparative Example 4

Figure 33:
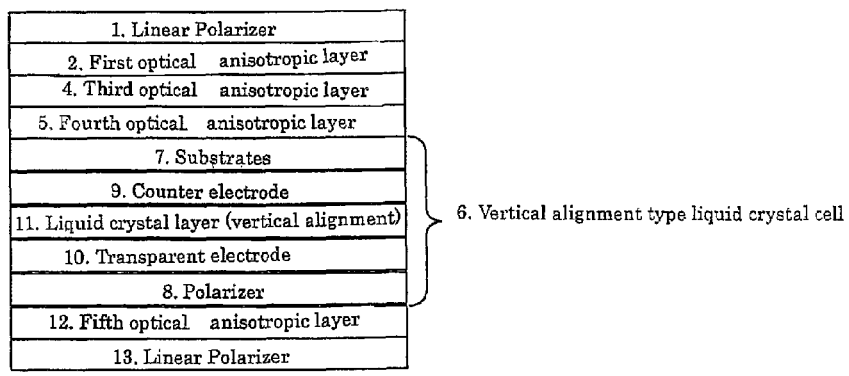
FIG. 33 is a schematic sectional view of the vertical alignment type liquid crystal display device used in Comparative Example 4.

A vertical alignment type liquid crystal display device shown in FIG. 33 was produced in accordance with the procedures of Example 9 except that the second optical anisotropic layer 3 formed of the homeotropically-aligned liquid crystal film was excluded.

Figure 34:
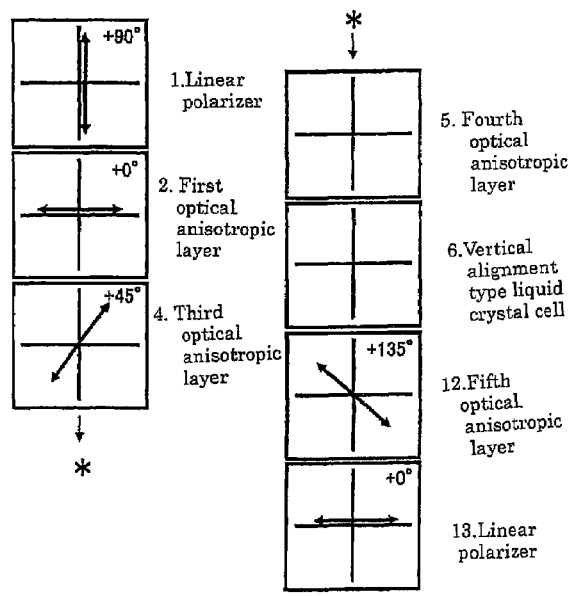
FIG. 34 is a plan view indicating the angular relations of each of the components of the vertical alignment type liquid crystal display of Comparative Example 4.

FIG. 34 shows the relation of angle in each component. The third and fifth optical anisotropic layers 4, 12 had retardations Re3, Re5 of 137.5 nm. The Re1 and Rth4 values of the first and fourth optical anisotropic layers were optimized to be widest in viewing angle characteristics and were set to 115 nm and 205 nm, respectively.

Figure 35:
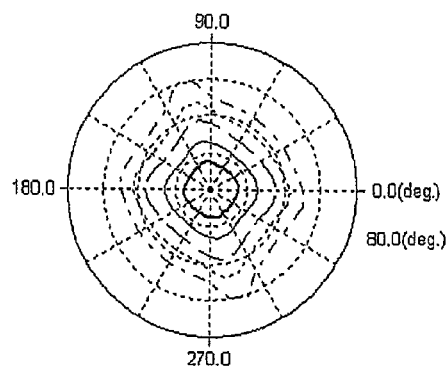
FIG. 35 is a view indicating the contrast ratio when viewing the vertical alignment type liquid crystal display of Comparative Example 4 from all the directions.

FIG. 35 shows the contrast ratio from all the directions defined by the transmissivity ratio of black image 0V and white image 5V "(white image)/(black image)".

As the result of comparison between the contrast contours in the all direction shown in FIGS. 20 and 23 and those in FIG. 35, it was found that the viewing angle characteristics were extremely improved by adding the homeotropically-aligned liquid crystal film.

Comparative Example 5

Figure 36:
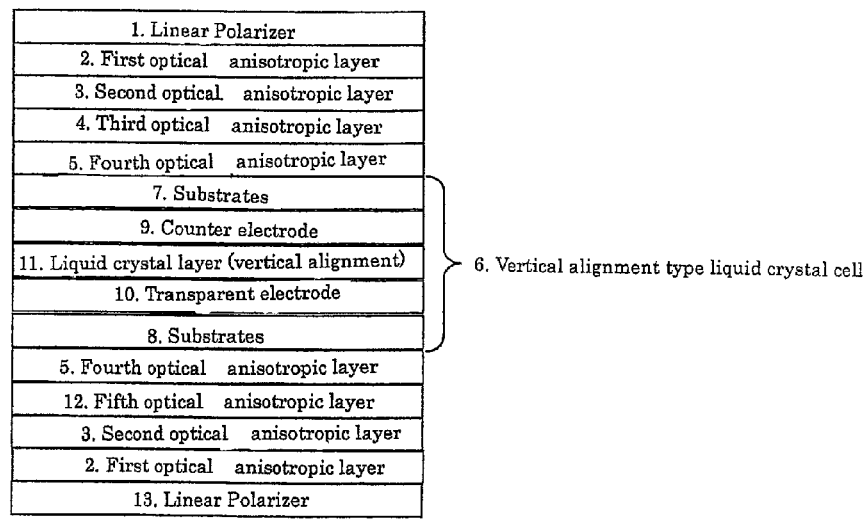
FIG. 36 is a schematic sectional view of the vertical alignment type liquid crystal display device used in Comparative Example 5.

The vertical alignment type liquid crystal display device of Comparative Example 5 will be described with reference to FIGS. 36 and 37.

The vertical alignment type liquid crystal cell 6 was the same as that used in Example 9.

A linear polarizer 1 (thickness: about 105 μm, SQW-062 manufactured by Sumitomo Chemical Co., Ltd.) was arranged above the displaying side (upper side of the drawing) of the vertical alignment type liquid crystal cell 6. Between the upper linear polarizer 1 and the liquid crystal cell 6 were arranged a first optical anisotropic layer 2 (ZEONOR manufactured by ZEON CORPORATION), a second optical anisotropic layer 3 formed of the homeotropically-alignment liquid crystal film prepared in Example 8, a third optical anisotropic layer 4 (ZEONOR manufactured by ZEON CORPORATION) and a fourth optical anisotropic layer 5 (ARTON manufactured by JSR Corporation). A linear polarizer 13 (thickness: about 105 μm, SQW-062 manufactured by Sumitomo Chemical Co., Ltd.) was arranged below the rear side (lower side of the drawing) of the vertical alignment type liquid crystal cell 6. Between the lower linear polarizer 13 and the liquid crystal cell 6 were arranged a first optical anisotropic layer 2 (ZEONOR manufactured by ZEON CORPORATION), a second optical anisotropic layer 3 formed of the homeotropically-alignment liquid crystal film prepared in Example 8, a fifth optical anisotropic layer 12 (ZEONOR manufactured by ZEON CORPORATION), and a fourth optically anisotropic layer 5 (ARTON manufactured by JSR Corporation).

Figure 37:
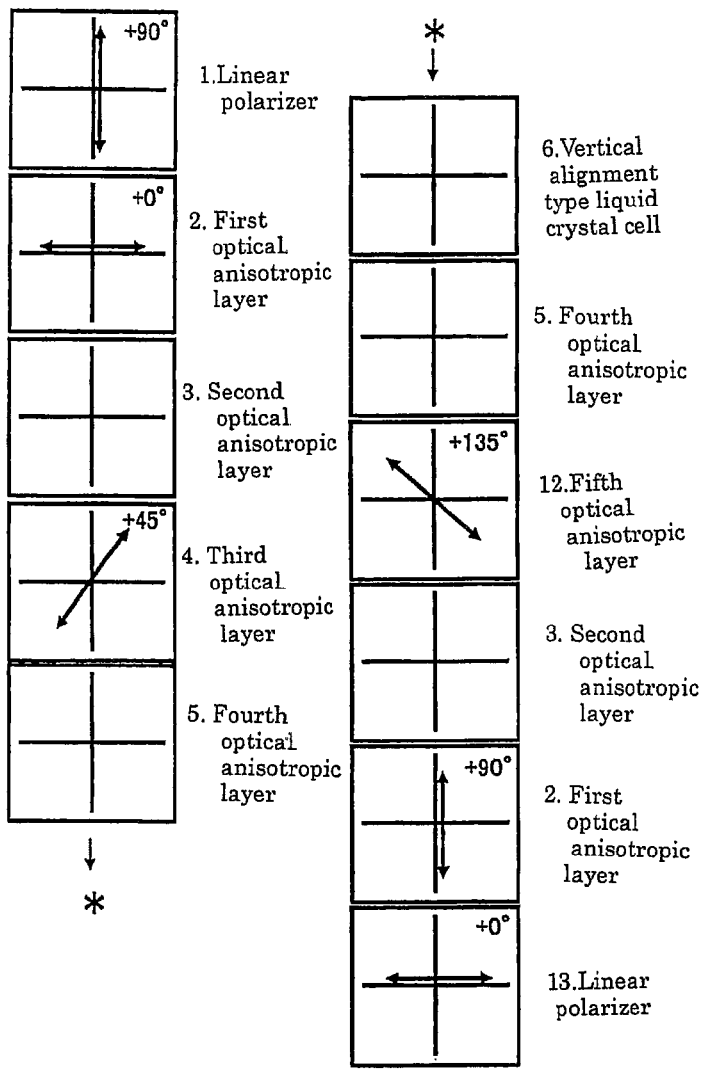
FIG. 37 is a plan view indicating the angular relations of each of the components of the vertical alignment type liquid crystal display of Comparative Example 5.

The absorption axis orientations of the linear polarizers 1, 13 were set to 90 degrees and 0 degree in the plane, respectively, as indicated by arrows in FIG. 37. The slow axis orientation of the first optical anisotropic layer 2 was set to 0 degree, as indicated by an arrow in FIG. 37, and the layer 2 had a retardation Re1 of 105 nm. The slow axis orientations of the third and fifth optical anisotropic layers 4, 12 were set to 45 degrees and 135 degrees, as indicated by an arrow in FIG. 37, and had retardations Re3, Re5 of 137.5 nm.

The fourth optical anisotropic layer 5 had a retardation Re4 of about 0 nm and a retardation Rth4 of 140 nm.

The second optical anisotropic layer 3 formed of the homeotropically-aligned liquid crystal film had a retardation Re2 of 0 nm and a retardation Rth2 of −90 nm.

Figure 38:
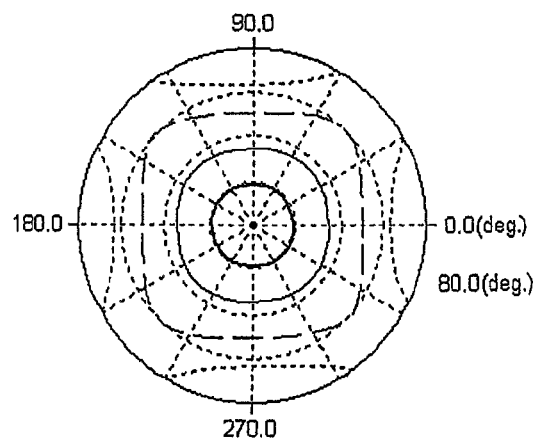
FIG. 38 is a view indicating the contrast ratio when viewing the vertical alignment type liquid crystal display of Comparative Example 5 from all the directions.

FIG. 38 shows the contrast ratio from all the directions defined by the transmissivity ratio of black image 0V and white image 5V "(white image)/(black image)".

As the result of comparison between the contrast contours in the all direction shown in FIGS. 20 and 23 and those in FIG. 38, it was found that substantially equal viewing angle characteristics were obtained and thus changing component arrangement to that as defined by the present invention was able to decrease the number of films resulting in a decrease in the cost and thickness of the device, maintaining viewing angle characteristics.

APPLICABILITY IN THE INDUSTRY

The vertical alignment type liquid crystal display device of the present invention is bright in images and capable of displaying images of high contrast in all the directions and thus has a large industrial value.

The invention claimed is:

1. An elliptical polarizer comprising at least a first polarizer, a first optical anisotropic layer, a second optical anisotropic layer, and a third optical anisotropic layer, laminated in this order,
wherein
the first optical anisotropic layer satisfies requirement [1] below $$50 \leq Re1 \leq 500 \quad [1]$$

wherein Re1 denotes the retardation value in the plane of the first optical anisotropic layer and is defined by Re1=(Nx1−Ny1)×d1 [nm] wherein d1 indicates the thickness of the first optical anisotropic layer, Nx1 and Ny1 indicate the main refractive indices in the plane of the first optical anisotropic layer with respect to a light of a wavelength of 550 nm, Nz1 indicates the main refractive index in the thickness direction of the first optical anisotropic layer with respect to a light of a wavelength of 550 nm, and Nx1>Nz1≧Ny1;

the second optical anisotropic layer satisfies requirements [2] and [3] below $$0 \leq Re2 \leq 20 \quad [2]$$

$$-500 \leq Rth2 \leq -30 \quad [3]$$

wherein Re2 and Rth2 indicate the retardation values in the plane of the second optical anisotropic layer and in the thickness direction of the second optical anisotropic layer, respectively and are defined by Re2=(Nx2−Ny2)×d2 [nm] and Rth2={(Nx2+Ny2)/2−Nz2}×d2 [nm], respectively wherein d2 indicates the thickness of the second optical anisotropic layer, Nx2 and Ny2 indicate the main refractive indices in the plane of the second optical anisotropic layer with respect to a light of a wavelength of 550 nm, Nz2 indicates the main refractive index in the thickness direction of the second optical anisotropic layer with respect to a light of a wavelength of 550 nm, and Nz2>Nx2≧Ny2; and the third optical anisotropic layer satisfies requirement [4] below $$100 \leq Re3 \leq 180 \quad [4]$$

wherein Re3 indicates the retardation value in the plane of the third optical anisotropic layer and is defined by Re3=(Nx3−Ny3)×d3 [nm] wherein d3 indicates the thickness of the third optical anisotropic layer, Nx3 and Ny3 indicate the main refractive indices in the plane of the third optical anisotropic layer with respect to a light of a wavelength of 550 nm, Nz3 indicates the main refractive index in the thickness direction of the third optical anisotropic layer with respect to a light of a wavelength of 550 nm, and Nx3>Ny3>Nz3.

2. The elliptical polarizer according to claim 1, wherein the third optical anisotropic layer further satisfies requirements [5] and [6] below $$50 \leq Rth3 \leq 600 \quad [5]$$

$$0.5 \leq Rth3/Re3 \leq 3.5 \quad [4]$$

wherein Rth3 indicates the retardation value in the thickness direction of the third optical anisotropic layer and is defined by Rth3={(Nx3+Ny3)/2−Nz3}×d3 [nm].

3. The elliptical polarizer according to claim 1, wherein the first optical anisotropic layer fulfills requirement [1]

$$50 \leq Re1 \leq 300. \quad [1]$$

4. The elliptical polarizer according to claim 1, wherein the second optical anisotropic layer comprises a homeotropically aligned liquid crystal film produced by aligning and fixing a liquid crystalline composition exhibiting a positive uniaxiality, in a homeotropic alignment while the composition is in the liquid crystal state.

5. The elliptical polarizer according to claim 4, wherein the liquid crystalline composition exhibiting a positive uniaxiality comprises a side chain liquid crystalline polymer having an oxetanyl group.

6. The elliptical polarizer according to claim 1, wherein the first and third optical anisotropic layers each comprise a thermoplastic containing a polycarbonate resin or a cyclo-olefin polymer resin.

7. The elliptical polarizer according to claim 1, wherein the third optical anisotropic layer further satisfies requirement [10] below $$0.75 \leq Re3(450)/Re3(590) \leq 1.05 \quad [10]$$

wherein Re3(450) and Re3(590) indicate the retardation values in the plane of the third optical anisotropic layer with respect to lights of wavelengths of 450 nm and 590 nm, respectively.

8. The elliptical polarizer according to claim 1, wherein the first polarizer and the first optical anisotropic layer are arranged so that the absorption axis of the former is perpendicular or parallel to the slow axis of the latter.

9. The elliptical polarizer according to claim 1, wherein when the angle formed by the absorption axis of the first polarizer and the slow axis of the third optical anisotropic layer is defined as "p", p satisfies $40° \leq p \leq 50°$.

10. The elliptical polarizer according to claim 1, wherein the first polarizer has a supporting layer with a retardation in the thickness direction Rth of greater than zero.

11. An elliptical polarizer comprising at least a first polarizer, a first optical anisotropic layer, a second optical anisotropic layer, a third optical anisotropic layer, and a fourth optical anisotropic layer, laminated in this order, wherein the first optical anisotropic layer satisfies requirement [1] below $$50 \leq Re1 \leq 500 \quad [1]$$

wherein Re1 denotes the retardation value in the plane of the first optical anisotropic layer and is defined by $Re1=(Nx1-Ny1) \times d1$ [nm] wherein d1 indicates the thickness of the first optical anisotropic layer, Nx1 and Ny1 indicate the main refractive indices in the plane of the first optical anisotropic layer with respect to a light of a wavelength of 550 nm, Nz1 indicates the main refractive index in the thickness direction of the first optical anisotropic layer with respect to a light of a wavelength of 550 nm, and $Nx1>Nz1 \geq Ny1$;

the second optical anisotropic layer satisfies requirements [2] and [3] below $$0 \leq Re2 \leq 20 \quad [2]$$

$$-500 \leq Rth2 \leq -30 \quad [3]$$

wherein Re2 and Rth2 indicate the retardation values in the plane of the second optical anisotropic layer and in the thickness direction of the second optical anisotropic layer, respectively and are defined by $Re2=(Nx2-Ny2) \times d2$ [nm] and $Rth2=\{(Nx2+Ny2)/2-Nz2\} \times d2$ [nm], respectively wherein d2 indicates the thickness of the second optical anisotropic layer, Nx2 and Ny2 indicate the main refractive indices in the plane of the second optical anisotropic layer with respect to a light of a wavelength of 550 nm, Nz2 indicates the main refractive index in the thickness direction of the second optical anisotropic layer with respect to a light of a wavelength of 550 nm, and $Nz2>Nx2 \geq Ny2$;

the third optical anisotropic layer satisfies requirement [4] below $$100 \leq Re1 \leq 180 \quad [4]$$

wherein Re3 indicates the retardation value in the plane of the third optical anisotropic layer and is defined by $Re3=(Nx3-Ny3) \times d3$ [nm] wherein d3 indicates the thickness of the third optical anisotropic layer, Nx3 and Ny3 indicate the main refractive indices in the plane of the third optical anisotropic layer with respect to a light of a wavelength of 550 nm, Nz3 indicates the main refractive index in the thickness direction of the third optical anisotropic layer with respect to a light of a wavelength of 550 nm, and $Nx3>Ny3=Nz3$; and the fourth optical anisotropic element satisfies requirements [12] and [13] below $$0 \leq Re4 \leq 20 \quad [12]$$

$$100 \leq Rth4 \leq 400 \quad [13]$$

wherein Re4 and Rth4 indicate the retardation values in the plane of the fourth optical anisotropic layer and in the thickness direction of the fourth optical anisotropic layer, respectively and are defined by $Re4=(Nx4-Ny4) \times d4$ [nm] and $Rth4=\{(Nx4+Ny4)/2-Nz4\} \times d4$ [nm], respectively wherein d4 indicates the thickness of the fourth optical anisotropic layer, Nx4 and Ny4 indicate the main refractive indices in the plane of the fourth optical anisotropic layer with respect to a light of a wavelength of 550 nm, Nz4 indicates the main refractive index in the thickness direction of the fourth optical anisotropic layer with respect to a light of a wavelength of 550 nm, and $Nx4 \geq Ny4 > Nz4$.

12. The elliptical polarizer according to claim 11, wherein the fourth optical anisotropic layer is a layer formed from at least one type of material selected from the group consisting of polymers such as liquid crystalline compounds, triacetyl cellulose, cyclo-olefin polymers, polyolefins, polyamides, polyimides, polyesters, polyether ketones, polyarylether ketones, polyamide imides, and polyester imides.

13. A vertical alignment type liquid crystal display device comprising at least a first polarizer, a first optical anisotropic layer, a second optical anisotropic layer, a third optical anisotropic layer, a vertical alignment type liquid crystal cell comprising a pair of substrates with electrodes and liquid crystal molecules disposed therebetween, the liquid crystal molecules being aligned vertically to the substrates when no electric voltage is applied, a fourth optical anisotropic layer, and a second polarizer, arranged in this order, wherein the first optical anisotropic layer satisfies requirement [1] below $$50 \leq Re1 \leq 500 \quad [1]$$

wherein Re1 denotes the retardation value in the plane of the first optical anisotropic layer and is defined by $Re1=(Nx1-Ny1) \times d1$ [nm] wherein d1 indicates the thickness of the first optical anisotropic layer, Nx1 and Ny1 indicate the main refractive indices in the plane of the first optical anisotropic layer with respect to a light of a wavelength of 550 nm, Nz1 indicates the main refractive index in the thickness direction of the first optical anisotropic layer with respect to a light of a wavelength of 550 nm, and $Nx1>Nz1 \geq Ny1$;

the second optical anisotropic layer satisfies requirements [2] and [3] below $$0 \leq Re2 \leq 20 \quad [2]$$

$$-500 \leq Rth2 \leq -30 \quad [3]$$

wherein Re2 and Rth2 indicate the retardation values in the plane of the second optical anisotropic layer and in the thickness direction of the second optical anisotropic layer, respectively and are defined by $Re2=(Nx2-Ny2) \times d2$ [nm] and $Rth2=\{(Nx2+Ny2)/2-Nz2\} \times d2$ [nm], respectively wherein d2 indicates the thickness of the second optical anisotropic layer, Nx2 and Ny2 indicate the main refractive indices in the plane of the second optical anisotropic layer with respect to a light of a wavelength of 550 nm, Nz2 indicates the main refractive index in the thickness direction of the second optical anisotropic layer with respect to a light of a wavelength of 550 nm, and $Nz2>Nx2 \geq Ny2$;

the third optical anisotropic layer satisfies requirement [4] below $$100 \leq Re3 \leq 180 \quad [4]$$

wherein Re3 indicates the retardation value in the plane of the third optical anisotropic layer and is defined by $Re3=(Nx3-Ny3) \times d3$ [nm] wherein d3 indicates the thickness of the third optical anisotropic layer, Nx3 and Ny3 indicate the main refractive indices in the plane of the third optical anisotropic layer with respect to a light of a wavelength of 550 nm, Nz3 indicates the main refractive index in the thickness direction of the third optical anisotropic layer with respect to a light of a wavelength of 550 nm, and Nx3>Ny3>Nz3; and the fourth optical anisotropic layer satisfies requirement [7] below $$100 \leq Re \leq 180 \quad [7]$$

wherein Re5 indicates the retardation value in the plane of the fourth optical anisotropic layer and is defined by Re5=(Nx5−Ny5)×d5 [nm] wherein d5 indicates the thickness of the fourth optical anisotropic layer, Nx5 and Ny5 indicate the main refractive indices in the plane of the fourth optical anisotropic layer with respect to a light of a wavelength of 550 nm, Nz5 indicates the main refractive index in the thickness direction of the fourth optical anisotropic layer with respect to a light of a wavelength of 550 nm, and Nx5>Ny5=Nz5.

14. The vertical alignment type liquid crystal display device according to claim 13, wherein the third optical anisotropic layer further satisfies requirements [5] and [6] below and the fourth optical anisotropic layer further satisfies requirements [8] and [9] below:

$$50 \leq Rth3 \leq 600 \quad [5]$$

$$0.5 \leq Rth3/Re3 \leq 3.5 \quad [6]$$

$$50 \leq Rth5 \leq 600 \quad [8]$$

$$0.5 \leq Rth5/Re5 \leq 3.5 \quad [9]$$

wherein Rth3 indicates the retardation value in the thickness direction of the third optical anisotropic layer and is defined by Rth3={(Nx3+Ny3)/2−Nz3}×d3 [nm], and Rth5 indicates the retardation value in the thickness direction of the fourth optical anisotropic layer and is defined by Rth5={(Nx5+Ny5)/2−Nz5}×d5 [nm].

15. The vertical alignment type liquid crystal display device according to claim 13, wherein the second optical anisotropic layer comprises a homeotropically aligned liquid crystal film produced by aligning and fixing a liquid crystalline composition exhibiting a positive uniaxiality, in a homeotropic alignment while the composition is in the liquid crystal state.

16. The vertical alignment type liquid crystal display device according to claim 15, wherein the liquid crystalline composition exhibiting a positive uniaxiality comprises a side chain liquid crystalline polymer having an oxetanyl group.

17. The vertical alignment type liquid crystal display device according to claim 13, wherein the first, third and fourth optical anisotropic layers each comprise a thermoplastic polymer containing a polycarbonate resin or a cyclo-olefin polymer resin.

18. The vertical alignment type liquid crystal display device according to claim 13, wherein the third optical anisotropic layer further satisfies requirement [10] below $$0.7 \leq Re3(450)/Re3(590) \leq 1.05 \quad [10]$$

wherein Re3(450) and Re3(590) indicate the retardation values in the plane of the third optical anisotropic layer with respect to lights of wavelengths of 450 nm and 590 nm, respectively.

19. The vertical alignment type liquid crystal display device according to claim 13, wherein the fourth optical anisotropic layer further satisfies requirement [11] below $$0.7 \leq Re5(450)/Re5(590) \leq 1.05 \quad [11]$$

wherein Re5(450) and Re3(590) indicate the retardation values in the plane of the fourth optical anisotropic layer with respect to lights of wavelengths of 450 nm and 590 nm, respectively.

20. The vertical alignment type liquid crystal display device according to claim 13, wherein the first polarizer and the first optical anisotropic layer are arranged so that the absorption axis of the former is perpendicular or parallel to the slow axis of the latter.

21. The vertical alignment type liquid crystal display device according to claim 13, wherein the third optical anisotropic layer and the fourth optical anisotropic layer are arranged so that the slow axis of the former is perpendicular to the slow axis of the latter.

22. The vertical alignment type liquid crystal display device according to claim 13, wherein when the angle formed by the absorption axis of the first polarizer and the slow axis of the third optical anisotropic layer is defined as "p" and the angle formed by the absorption angle of the second polarizer and the slow axis of the fourth optically anisotropic layer is defined as "q", p satisfies 40°≤p≤50° and q satisfies 40°≤q≤50°.

23. The vertical alignment type liquid crystal display device according to claim 13, wherein the first and second polarizers each have a supporting layer with a retardation in the thickness direction Rth of greater than zero.

24. The vertical alignment type liquid crystal display device according to claim 13, wherein one of the pair of substrates of the vertical alignment type liquid crystal cell is a substrate having reflection and transmission functions.

25. A vertical alignment type liquid crystal display device comprising at least a first polarizer, a second optical anisotropic layer, a third optical anisotropic layer, a vertical alignment type liquid crystal cell comprising a pair of substrates with electrodes and liquid crystal molecules disposed therebetween, the liquid crystal molecules being aligned vertically to the substrates when no electric voltage is applied, a fourth optical anisotropic layer, a first optical anisotropic layer, and a second polarizer, arranged in this order, wherein the first optical anisotropic layer satisfies requirement [1] below $$50 \leq Re1 \leq 500 \quad [1]$$

wherein Re1 denotes the retardation value in the plane of the first optical anisotropic layer and is defined by Re1=(Nx1−Ny1)×d1 [nm] wherein d1 indicates the thickness of the first optical anisotropic layer, Nx1 and Ny1 indicate the main refractive indices in the plane of the first optical anisotropic layer with respect to a light of a wavelength of 550 nm, Nz1 indicates the main refractive index in the thickness direction of the first optical anisotropic layer with respect to a light of a wavelength of 550 nm, and Nx1>Nz1≧Ny1;

the second optical anisotropic layer satisfies requirements [2] and [3] below $$0 \leq Re2 \leq 20 \quad [2]$$

$$-500 \leq Rth2 \leq -30 \quad [3]$$

wherein Re2 and Rth2 indicate the retardation values in the plane of the second optical anisotropic layer and in the thickness direction of the second optical anisotropic layer, respectively and are defined by Re2=(Nx2−Ny2)×d2 [nm] and Rth2={(Nx2+Ny2)/2−Nz2}×d2 [nm], respectively wherein d2 indicates the thickness of the second optical anisotropic layer, Nx2 and Ny2 indicate the main refractive indices in the plane of the second optical anisotropic layer with respect to a light of a wavelength of 550 nm, Nz2 indicates the main refractive index in the thickness direction of the second optical anisotropic layer with respect to a light of a wavelength of 550 nm, and Nz2>Nx2≧Ny2;

the third optical anisotropic layer satisfies requirements [4] to [6] below $$100 \leq Re3 \leq 180 \quad [4]$$

$$50 \leq Rth3 \leq 600 \quad [5]$$

$$0.5 \leq Rth3/Re3 \leq 3.5 \quad [6]$$

wherein Re3 indicates the retardation value in the plane of the third optical anisotropic layer and is defined by Re3=(Nx3−Ny3)×d3 [nm] wherein d3 indicates the thickness of the third optical anisotropic layer, Nx3 and Ny3 indicate the main refractive indices in the plane of the third optical anisotropic layer with respect to a light of a wavelength of 550 nm, Nz3 indicates the main refractive index in the thickness direction of the third optical anisotropic layer with respect to a light of a wavelength of 550 nm, and Nx3>Ny3>Nz3; and the fourth optical anisotropic layer satisfies requirements [7] to [9] below $$100 \leq Re5 \leq 180 \quad [7]$$

$$50 \leq Rth5 \leq 600 \quad [8]$$

$$0.5 \leq Rth5/Re5 \leq 3.5 \quad [9]$$

wherein Re5 indicates the retardation value in the plane of the fourth optical anisotropic layer and is defined by Re5=(Nx5−Ny5)×d5 [nm] wherein d5 indicates the thickness of the fifth fourth optical anisotropic layer, Nx5 and Ny5 indicate the main refractive indices in the plane of the fourth optical anisotropic layer with respect to a light of a wavelength of 550 nm, Nz5 indicates the main refractive index in the thickness direction of the fourth optical anisotropic layer with respect to a light of a wavelength of 550 nm, and Nx5>Ny5=Nz5.

26. A vertical alignment type liquid crystal display device comprising at least a first polarizer, a first optical anisotropic layer, a second optical anisotropic layer, a third optical anisotropic layer, a fourth optical anisotropic layer, a vertical alignment type liquid crystal cell comprising a pair of substrates with electrodes and liquid crystal molecules disposed therebetween, the liquid crystal molecules being aligned vertically to the substrates when no electric voltage is applied, a fifth optical anisotropic layer, and a second polarizer, arranged in this order, wherein the first optical anisotropic layer satisfies requirement [1] below $$50 \leq Re1 \leq 500 \quad [1]$$

wherein Re1 denotes the retardation value in the plane of the first optical anisotropic layer and is defined by Re1=(Nx1−Ny1)×d1 [nm] wherein d1 indicates the thickness of the first optical anisotropic layer, Nx1 and Ny1 indicate the main refractive indices in the plane of the first optical anisotropic layer with respect to a light of a wavelength of 550 nm, Nz1 indicates the main refractive index in the thickness direction of the first optical anisotropic layer with respect to a light of a wavelength of 550 nm, and Nx1>Nz1≧Ny1;

the second optical anisotropic layer satisfies requirements [2] and [3] below $$0 \leq Re2 \leq 20 \quad [2]$$

$$-500 \leq Rth2 \leq -30 \quad [3]$$

wherein Re2 and Rth2 indicate the retardation values in the plane of the second optical anisotropic layer and in the thickness direction of the second optical anisotropic layer, respectively and are defined by Re2=(Nx2−Ny2)×d2 [nm] and Rth2={(Nx2+Ny2)/2−Nz2}×d2 [nm], respectively wherein d2 indicates the thickness of the second optical anisotropic layer, Nx2 and Ny2 indicate the main refractive indices in the plane of the second optical anisotropic layer with respect to a light of a wavelength of 550 nm, Nz2 indicates the main refractive index in the thickness direction of the second optical anisotropic layer with respect to a light of a wavelength of 550 nm, and Nz2>Nx2≧Ny2;

the third optical anisotropic layer satisfies requirement [4] below $$100 \leq Re3 \leq 180 \quad [4]$$

wherein Re3 indicates the retardation value in the plane of the third optical anisotropic layer and is defined by Re3=(Nx3−Ny3)×d3 [nm] wherein d3 indicates the thickness of the third optical anisotropic layer, Nx3 and Ny3 indicate the main refractive indices in the plane of the third optical anisotropic layer with respect to a light of a wavelength of 550 nm, Nz3 indicates the main refractive index in the thickness direction of the third optical anisotropic layer with respect to a light of a wavelength of 550 nm, and Nx3>Ny3=Nz3;

the fourth optical anisotropic element satisfies requirements [12] and [13] below $$0 \leq Re4 \leq 20 \quad [12]$$

$$100 \leq Rth4 \leq 400 \quad [13]$$

wherein Re4 and Rth4 indicate the retardation values in the plane of the fourth optical anisotropic layer and in the thickness direction of the fourth optical anisotropic layer, respectively and are defined by Re4=(Nx4−Ny4)×d4 [nm] and Rth4={(Nx4+Ny4)/2−Nz4}×d4 [nm], respectively wherein d4 indicates the thickness of the fourth optical anisotropic layer, Nx4 and Ny4 indicate the main refractive indices in the plane of the fourth optical anisotropic layer with respect to a light of a wavelength of 550 nm, Nz4 indicates the main refractive index in the thickness direction of the fourth optical anisotropic layer with respect to a light of a wavelength of 550 nm, and Nx4≧Ny4>Nz4; and the fifth optical anisotropic layer satisfies requirement [7] below $$100 \leq Re5 \leq 180 \quad [7]$$

wherein Re5 indicates the retardation value in the plane of the fifth optical anisotropic layer and is defined by Re5=(Nx5−Ny5)×d5 [nm] wherein d5 indicates the thickness of the fifth optical anisotropic layer, Nx5 and Ny5 indicate the main refractive indices in the plane of the fifth optical anisotropic layer with respect to a light of a wavelength of 550 nm, Nz5 indicates the main refractive index in the thickness direction of the fifth optical anisotropic layer with respect to a light of a wavelength of 550 nm, and Nx5>Ny5=Nz5.

27. The vertical alignment type liquid crystal display device according to claim 26, wherein the first optical anisotropic layer fulfills requirement [1]

$$50 \leq Re1 \leq 300. \quad [1]$$

28. The vertical alignment type liquid crystal display device according to claim 27, further comprising a sixth optical anisotropic layer satisfying requirements [14] and [15] below between the vertical alignment type liquid crystal cell and the fifth optically anisotropic layer:

$$0 \leq Re6 \leq 20 \quad [14]$$

$$100 \leq Rth6 \leq 400 \quad [15]$$

wherein Re6 and Rth6 indicate the retardation values in the plane of the sixth optical anisotropic layer and in the thickness direction of the sixth optical anisotropic layer, respectively and are defined by Re6=(Nx6−Ny6)×d6 [nm] and Rth6={(Nx6+Ny6)/2−Nz6}×d6 [nm], respectively wherein d6 indicates the thickness of the sixth optical anisotropic layer, Nx6 and Ny6 indicate the main refractive indices in the plane of the sixth optical anisotropic layer with respect to a light of a wavelength of 550 nm, Nz6 indicates the main refractive index in the thickness direction of the sixth optical anisotropic layer with respect to a light of a wavelength of 550 nm, and Nx6≧Ny6>Nz6.

29. The vertical alignment type liquid crystal display device according to claim 26, wherein the fourth optical anisotropic layer is a layer formed from at least one type of material selected from the group consisting of polymers such as liquid crystalline compounds, triacetyl cellulose, cyclo-olefin polymers, polyolefins, polyamides, polyimides, polyesters, polyether ketones, polyarylether ketones, polyamide imides, and polyester imides.

30. A vertical alignment type liquid crystal display device comprising at least a first polarizer, a second optical anisotropic layer, a third optical anisotropic layer, a fourth optical anisotropic layer, a vertical alignment type liquid crystal cell comprising a pair of substrates with electrodes and liquid crystal molecules disposed therebetween, the liquid crystal molecules being aligned vertically to the substrates when no electric voltage is applied, a fifth optical anisotropic layer, a first optical anisotropic layer, and a second polarizer, arranged in this order, wherein
the first optical anisotropic layer satisfies requirement [1] below $$50 \leq Re1 \leq 500 \quad [1]$$

wherein Re1 denotes the retardation value in the plane of the first optical anisotropic layer and is defined by Re1=(Nx1−Ny1)×d1 [nm] wherein d1 indicates the thickness of the first optical anisotropic layer, Nx1 and Ny1 indicate the main refractive indices in the plane of the first optical anisotropic layer with respect to a light of a wavelength of 550 nm, Nz1 indicates the main refractive index in the thickness direction of the first optical anisotropic layer with respect to a light of a wavelength of 550 nm, and Nx1>Nz1≧Ny1;
the second optical anisotropic layer satisfies requirements [2] and [3] below $$0 \leq Re2 \leq 20 \quad [2]$$

$$-500 \leq Rth2 \leq -30 \quad [3]$$

wherein Re2 and Rth2 indicate the retardation values in the plane of the second optical anisotropic layer and in the thickness direction of the second optical anisotropic layer, respectively and are defined by Re2=(Nx2−Ny2)×d2 [nm] and Rth2={(Nx2+Ny2)/2−Nz2}×d2 [nm], respectively wherein d2 indicates the thickness of the second optical anisotropic layer, Nx2 and Ny2 indicate the main refractive indices in the plane of the second optical anisotropic layer with respect to a light of a wavelength of 550 nm, Nz2 indicates the main refractive index in the thickness direction of the second optical anisotropic layer with respect to a light of a wavelength of 550 nm, and Nz2>Nx2>Ny2;
the third optical anisotropic layer satisfies requirement [4] below $$100 \leq Re3 \leq 180 \quad [4]$$

wherein Re3 indicates the retardation value in the plane of the third optical anisotropic layer and is defined by Re3=(Nx3−Ny3)×d3 [nm] wherein d3 indicates the thickness of the third optical anisotropic layer, Nx3 and Ny3 indicate the main refractive indices in the plane of the third optical anisotropic layer with respect to a light of a wavelength of 550 nm, Nz3 indicates the main refractive index in the thickness direction of the third optical anisotropic layer with respect to a light of a wavelength of 550 nm, and Nx3>Ny3=Nz3;
the fourth optical anisotropic element satisfies requirements [12] and [13] below $$0 \leq Re4 \leq 20 \quad [12]$$

$$100 \leq Rth4 \leq 400 \quad [13]$$

wherein Re4 and Rth4 indicate the retardation values in the plane of the fourth optical anisotropic layer and in the thickness direction of the fourth optical anisotropic layer, respectively and are defined by Re4=(Nx4−Ny4)×d4 [nm] and Rth4={(Nx4+Ny4)/2−Nz4}×d4 [nm], respectively wherein d4 indicates the thickness of the fourth optical anisotropic layer, Nx4 and Ny4 indicate the main refractive indices in the plane of the fourth optical anisotropic layer with respect to a light of a wavelength of 550 nm, Nz4 indicates the main refractive index in the thickness direction of the fourth optical anisotropic layer with respect to a light of a wavelength of 550 nm, and Nx4≧Ny4>Nz4; and
the fifth optical anisotropic layer satisfies requirement [7] below $$100 \leq Re5 \leq 180 \quad [7]$$

wherein Re5 indicates the retardation value in the plane of the fifth optical anisotropic layer and is defined by Re5=(Nx5−Ny5)×d5 [nm] wherein d5 indicates the thickness of the fifth optical anisotropic layer, Nx5 and Ny5 indicate the main refractive indices in the plane of the fifth optical anisotropic layer with respect to a light of a wavelength of 550 nm, Nz5 indicates the main refractive index in the thickness direction of the fifth optical anisotropic layer with respect to a light of a wavelength of 550 nm, and Nx5>Ny5=Nz5.

* * * * *